United States Patent
Sawaki

(10) Patent No.: US 10,545,339 B2
(45) Date of Patent: Jan. 28, 2020

(54) INFORMATION PROCESSING METHOD AND INFORMATION PROCESSING SYSTEM

(71) Applicant: COLOPL, Inc., Tokyo (JP)

(72) Inventor: Kazuaki Sawaki, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 16/034,355

(22) Filed: Jul. 13, 2018

(65) Prior Publication Data

US 2019/0025586 A1  Jan. 24, 2019

(30) Foreign Application Priority Data

Jul. 13, 2017  (JP) .................. 2017-137146

(51) Int. Cl.
*G06K 9/32* (2006.01)
*G02B 27/01* (2006.01)
*H04N 5/232* (2006.01)
*H04N 21/6587* (2011.01)
*G10L 17/26* (2013.01)
*G06K 9/00* (2006.01)
*G10L 15/05* (2013.01)
*G06Q 50/00* (2012.01)

(52) U.S. Cl.
CPC ....... *G02B 27/017* (2013.01); *G06K 9/00302* (2013.01); *G06K 9/3233* (2013.01); *G10L 15/05* (2013.01); *G10L 17/26* (2013.01); *H04N 5/23238* (2013.01); *H04N 5/23296* (2013.01); *H04N 21/6587* (2013.01); *G06Q 50/01* (2013.01)

(58) Field of Classification Search
None
See application file for complete search history.

(56) References Cited

U.S. PATENT DOCUMENTS 8,558,759 B1 * 10/2013 Prada Gomez ......... G06F 3/017
345/156
9,141,194 B1 * 9/2015 Keyes .................... G06F 3/017
(Continued)

FOREIGN PATENT DOCUMENTS

| JP | 2001-187266 A | 7/2001 |
|---|---|---|
| JP | 3227447 B2 | 11/2001 |
| WO | 2016/009864 A1 | 1/2016 |

*Primary Examiner* — Andrew G Yang
(74) *Attorney, Agent, or Firm* — Hauptman Ham, LLP

(57) ABSTRACT

A method includes defining a virtual space including a 360-degree moving image. The method includes playing back the 360-degree moving image. The method includes detecting a motion of a head-mounted device (HMD). The method includes defining a visual field in the 360-degree moving image based on the detected motion. The method includes detecting an emotion of a first user. The method includes comparing the detected emotion with a first condition. The method includes identifying a playback time of the 360-degree moving image at a timing of satisfaction of the first condition. The method includes identifying a direction indicated by the first user at the timing of satisfaction of the first condition. The method includes identifying a first region including a part of the 360-degree moving image corresponding to the identified direction. The method includes changing an evaluation value of the first region in response to satisfaction of the first condition.

17 Claims, 20 Drawing Sheets

(56) References Cited

U.S. PATENT DOCUMENTS

2016/0195923 A1* 7/2016 Nauseef .................. G06F 3/012
                                                      348/121
2016/0301866 A1* 10/2016 Kim ........................ G10L 25/87
2017/0142486 A1   5/2017 Masuda
2018/0366118 A1* 12/2018 Lovitt ................... G06F 16/635

* cited by examiner

INFORMATION PROCESSING METHOD AND INFORMATION PROCESSING SYSTEM

RELATED APPLICATIONS

The present application claims priority to Japanese Application No. 2017-137146, filed on Jul. 13, 2017, the disclosure of which is hereby incorporated by reference herein in its entirety.

TECHNICAL FIELD

This disclosure relates to an information processing method and an information processing system.

BACKGROUND

In Patent Document 1, there is described determination of a range of interest of video content based on overlapping of visual-field ranges of a plurality of users.

PATENT DOCUMENTS

[Patent Document 1] WO 2016/009864 A1

SUMMARY

According to at least one embodiment, there is provided an information processing method. The method includes defining a virtual space, which is associated with a 360-degree moving image. The method further includes playing back the 360-degree moving image; detecting a motion of a head-mounted device (HMD). The method further includes defining a visual field in the 360-degree moving image depending on the motion. The method further includes generating a visual-field image corresponding to the visual field. The method further includes identifying an emotion of a first user associated with the HMD. The method further includes detecting satisfaction of a first condition by the emotion; identifying a playback time of the 360-degree moving image at a timing of satisfaction of the first condition. The method further includes identifying a scene of the 360-degree moving image corresponding to the playback time. The method further includes identifying a direction indicated by the first user in the virtual space at the timing of satisfaction of the first condition. The method further includes identifying a first region, the first region including a part of the 360-degree moving image corresponding to the direction in the scene. The method further includes updating an evaluation value of the first region to a first value in response to satisfaction of the first condition.

DETAILED DESCRIPTION

Figure 1:
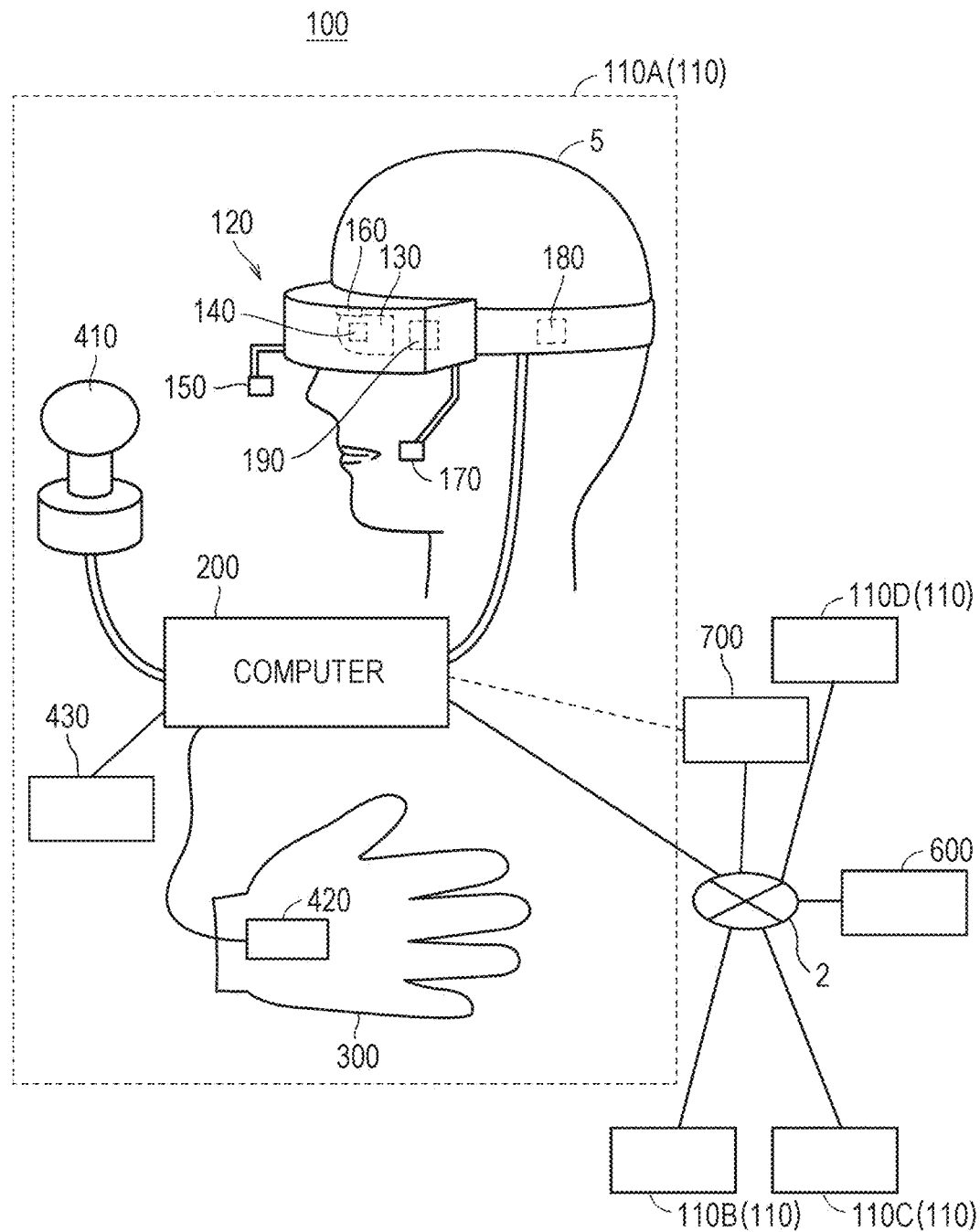
FIG. 1 A diagram of a system including a head-mounted device (HMD) according to at least one embodiment of this disclosure.

[Description of at Least One Embodiment of this Disclosure]

An outline of at least one embodiment of this disclosure is now described.

(1) An information processing method to be executed in a system including a head-mounted device according to at least one embodiment of this disclosure is an information processing method including generating virtual space data for defining a virtual space. The method further includes generating field-of-view image data representing a field-of-view image to be displayed on the head-mounted device based on a motion of the head-mounted device and the virtual space data. The method further includes identifying an emotion of a user wearing the head-mounted device. The method further includes updating, when the identified emotion satisfies a first condition determined in advance, an evaluation value of a first region in the virtual space, which depends on a direction of the head-mounted device at a time when the first condition is satisfied.

With this method, a region of interest (range of interest) of content in the virtual space is appropriately identified. That is, when a specific emotion of the user is detected, that time is identified as a time at which the content is exciting, and an evaluation point of the region of interest is updated depending on a direction (visual field) of the HMD at that time. Therefore, a truly exciting point of the content is not missed.

(2) In at least one embodiment, the information processing method further includes updating the evaluation value when an action of the user satisfies a second condition after the first condition is satisfied.

The eligibility of the characteristic of the range of interest is improved by adjusting the importance (attention) of the region of interest by further considering the action of the user after a specific emotion is detected.

(3) In at least one embodiment, the second condition further includes a condition that a plurality of users have had a conversation in the virtual space.

The action of communication among the plurality of users can be used to adjust the importance of the region of interest.

(4) In at least one embodiment, the conversation contains a language expression indicating the first region.

(5) In at least one embodiment, the conversation contains a tense expression indicating the time.

The importance of the region of interest is easily adjusted by using the action of communication among the users for the region of interest.

(6) In at least one embodiment, the second condition includes a condition that the user photographs the first region in the virtual space.

The importance of the region of interest is easily adjusted by using an action of photographing the region of interest.

(7) In at least one embodiment, the second condition includes an action of posting, by the user, a photograph obtained by photographing the first region in the virtual space to a social networking site.

An action of posting a photograph to an SNS is used to adjust the importance of the region of interest.

(8) In at least one embodiment, the information processing method further includes specifying the first region at the time when the evaluation value satisfies a third condition as the region of interest. The method further includes generating a video of the region of interest, wherein the video contains the time and has a certain time length before and after the time.

With this method, an advertisement video, for example, is generated by using the region of interest.

(9) In at least one embodiment, the video is generated based on a position of the region of interest in the virtual space and on a virtual camera arranged in the virtual space to define the field-of-view image based on a motion of the head-mounted device.

With this method, an advertisement video, for example, is easily generated.

(10) An information processing method to be executed in a system including a head-mounted device according to at least one embodiment of this disclosure is an information processing method including generating virtual space data for defining a virtual space. The method further includes generating field-of-view image data representing a field-of-view image to be displayed on the head-mounted device based on a motion of the head-mounted device and the virtual space data. The method further includes identifying an action of a user wearing the head-mounted device. The method further includes updating, when the identified action satisfies a second condition determined in advance, an evaluation value of a first region in the virtual space, which depends on a direction of the head-mounted device at a time when the second condition is satisfied.

With this method, the region of interest of content is appropriately identified without missing a truly exciting point of the content.

(11) An information processing program according to at least one embodiment of this disclosure is an information processing program for executing the information processing method of any one of Items (1) to (10) on a computer.

With the above-mentioned item, the information processing program capable of appropriately identifying the range of interest of content is provided.

(12) An information processing system using a head-mounted device according to at least one embodiment of this disclosure is an information processing system configured to execute the information processing method of any one of Items (1) to (10).

With the above-mentioned item, the information processing system capable of appropriately identifying the range of interest of content is provided.

(13) An information processing apparatus according to at least one embodiment of this disclosure is an information processing apparatus including a processor; and a memory configured to store a computer-readable instruction. The information processing apparatus is configured to execute, when the processor executes the computer-readable instruction, the information processing method of any one of Items (1) to (10).

With the above-mentioned item, the information processing apparatus capable of appropriately identifying the range of interest of content is provided. The information processing apparatus is any one of a user terminal or a server.

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth™ or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
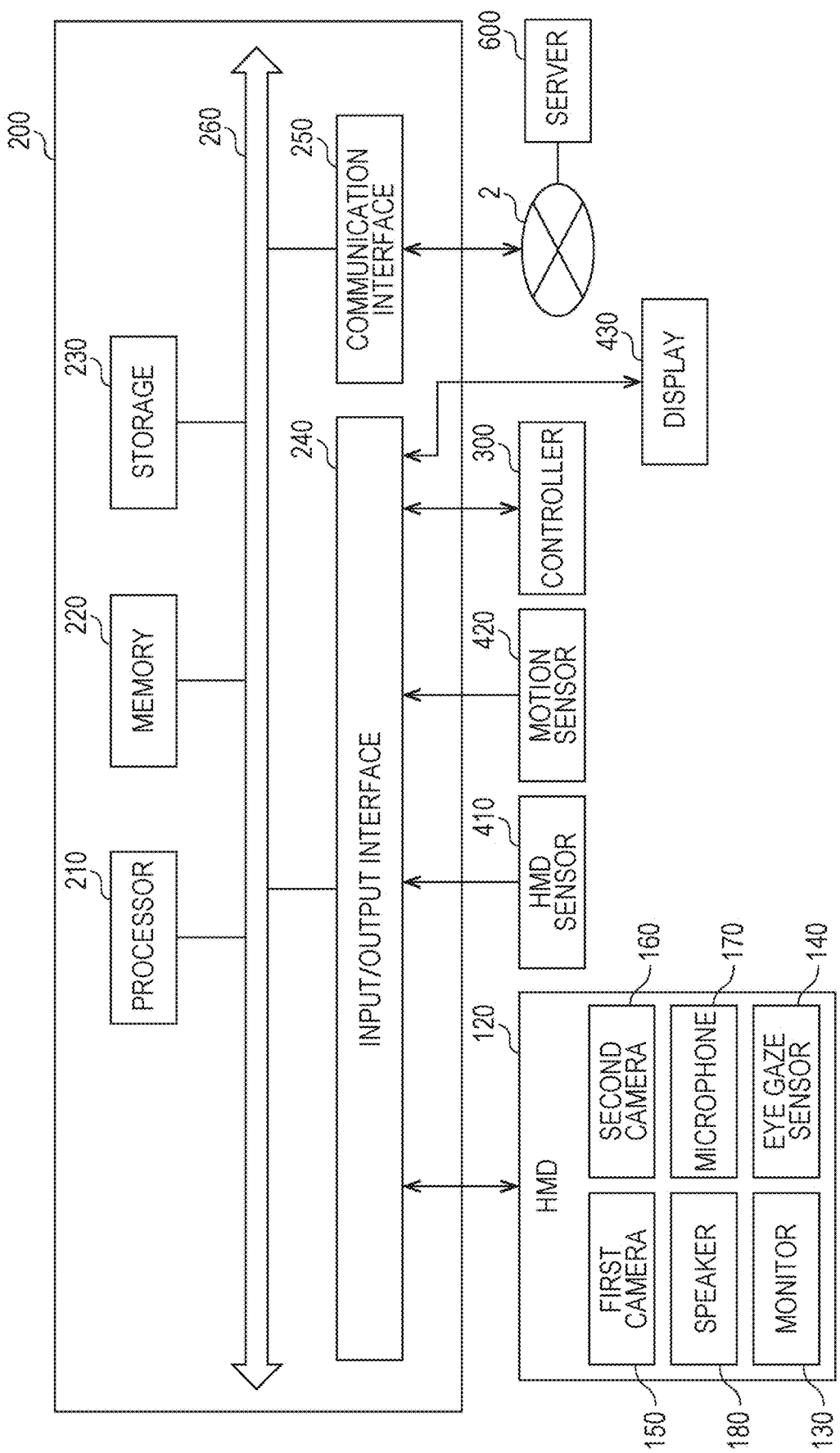
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
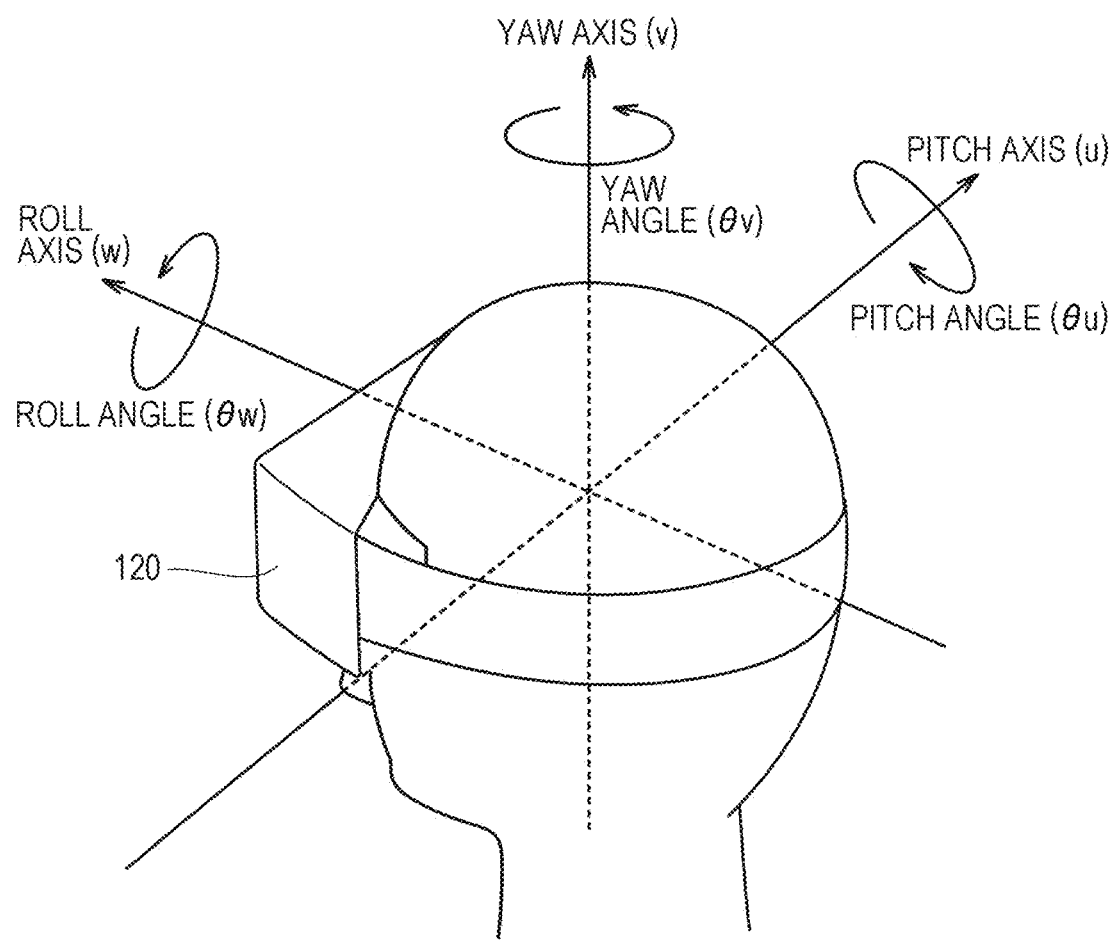
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
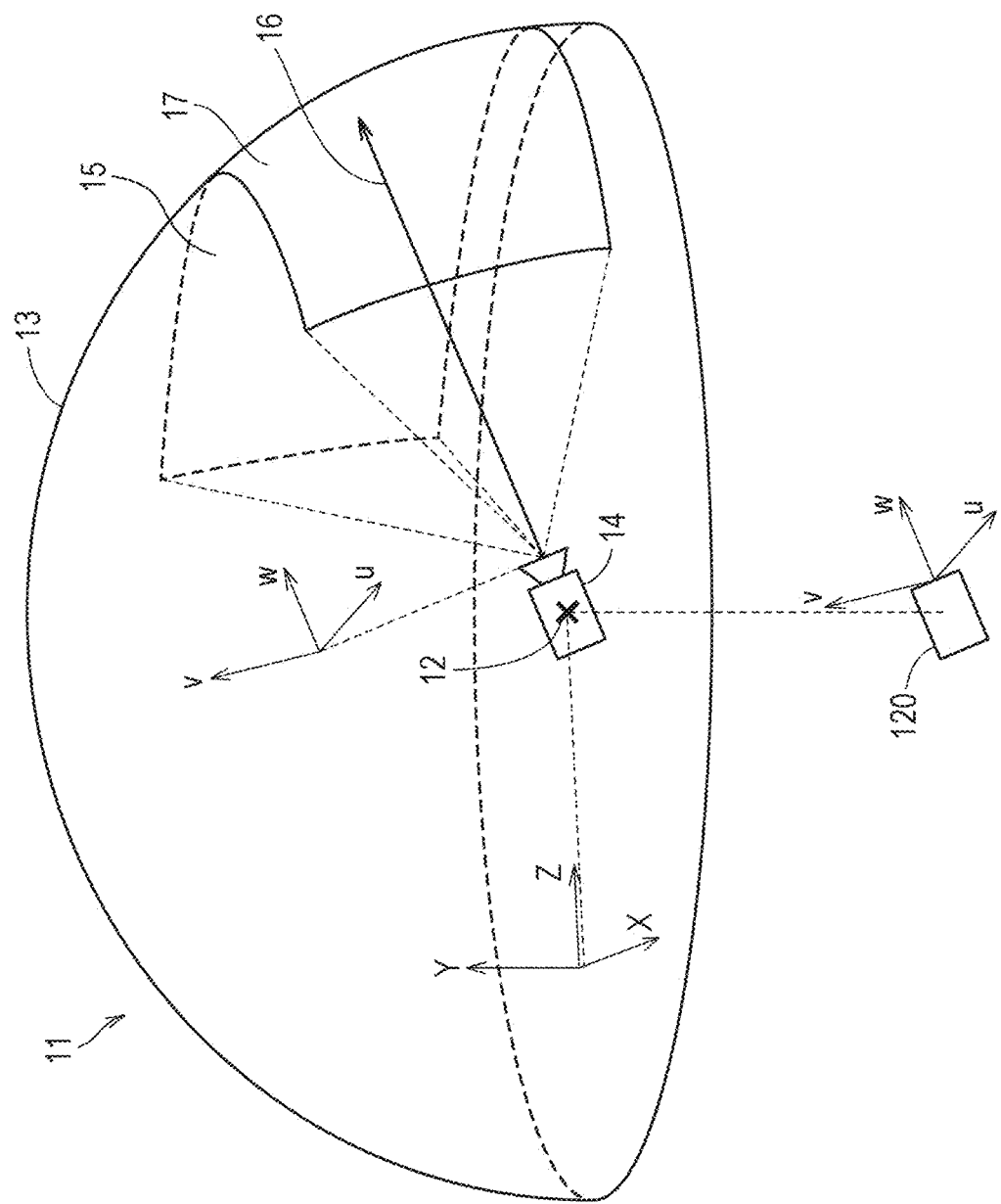
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
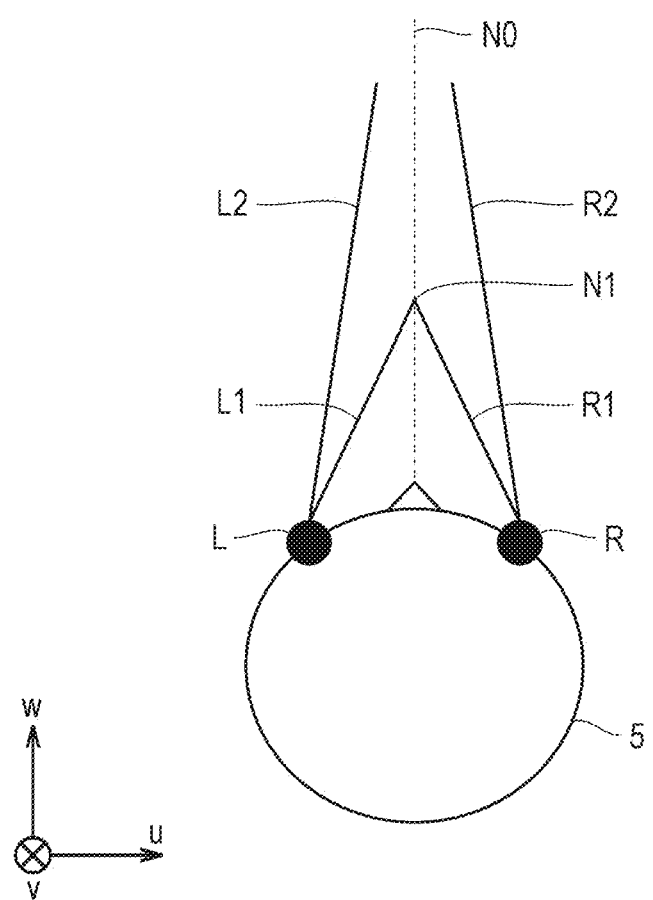
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
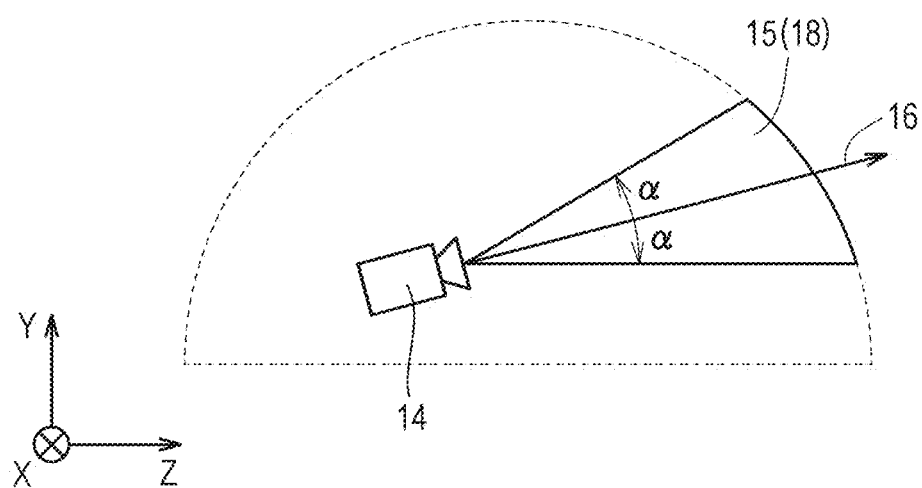
FIG. 6 A diagram of a YZ cross section obtained by viewing a field-of-view region from an X direction in the virtual space according to at least one embodiment of this disclosure.
Figure 7:
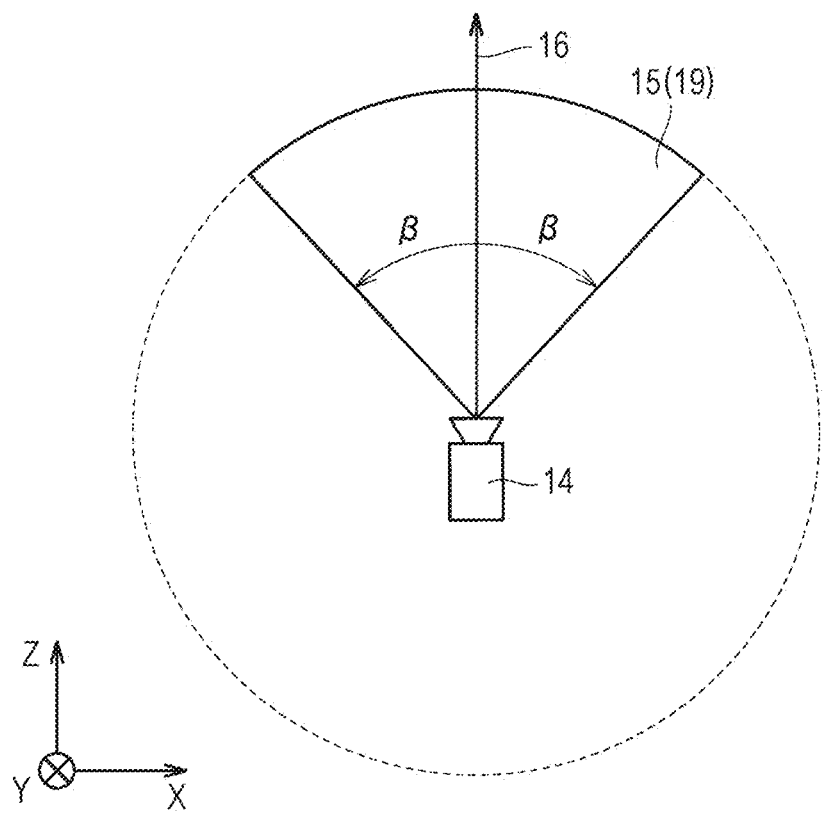
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle $\alpha$ from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth $\beta$ from the reference line of sight 16 serving as the center in the virtual space 11 as the region 19. The polar angle $\alpha$ and $\beta$ are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
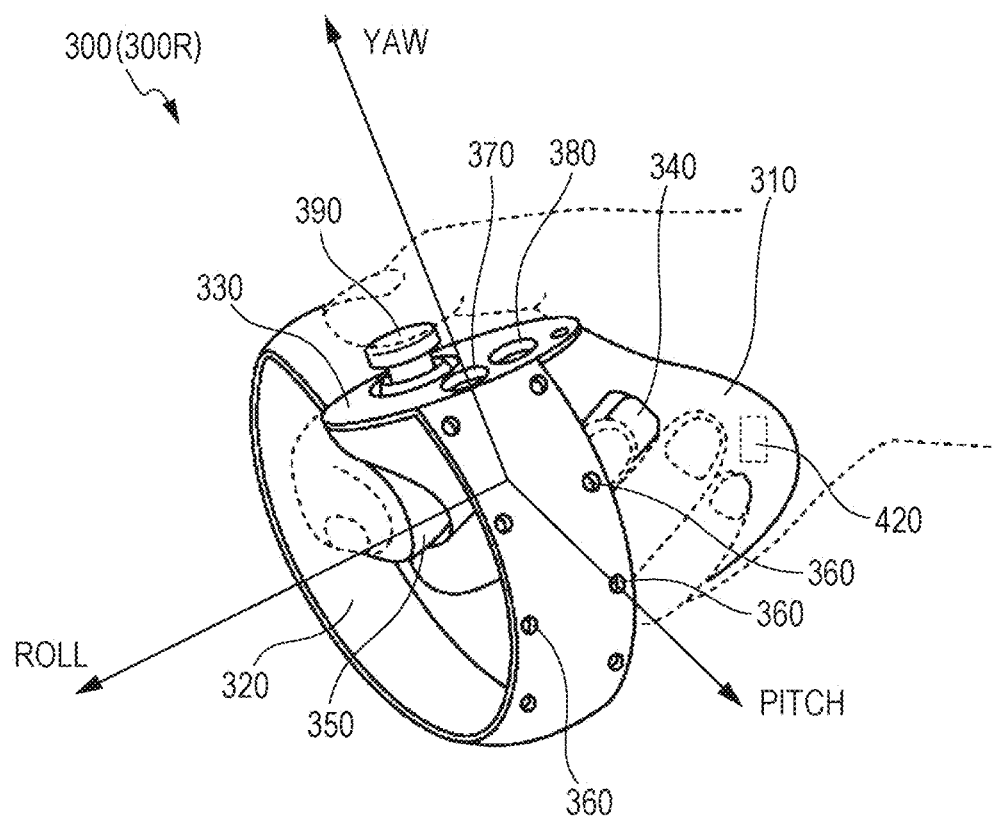
FIG. 8A A diagram of a schematic configuration of a controller according to at least one embodiment of this disclosure.
Figure 8B:
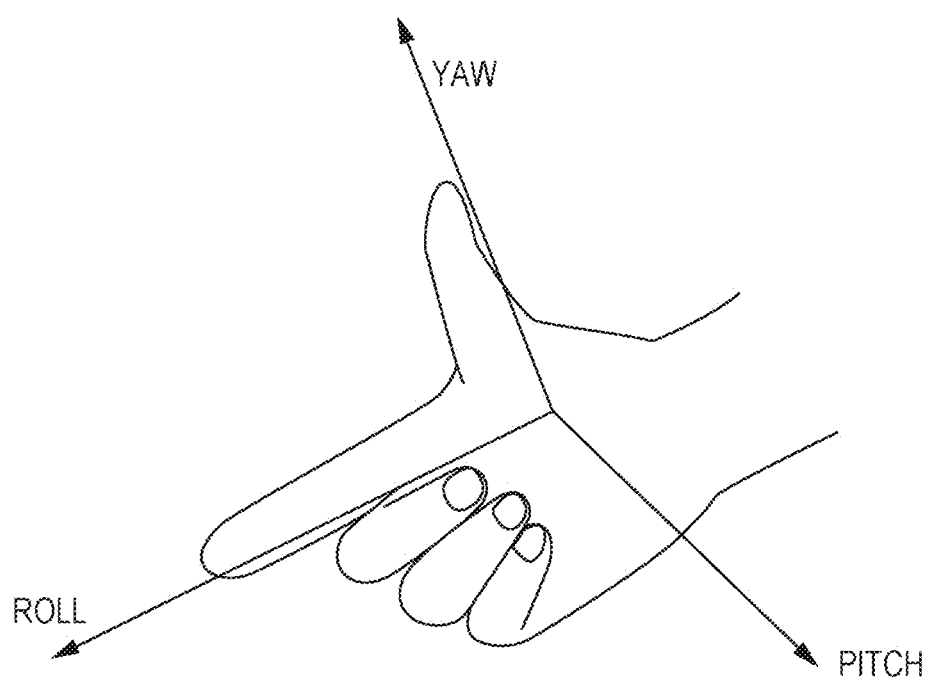
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
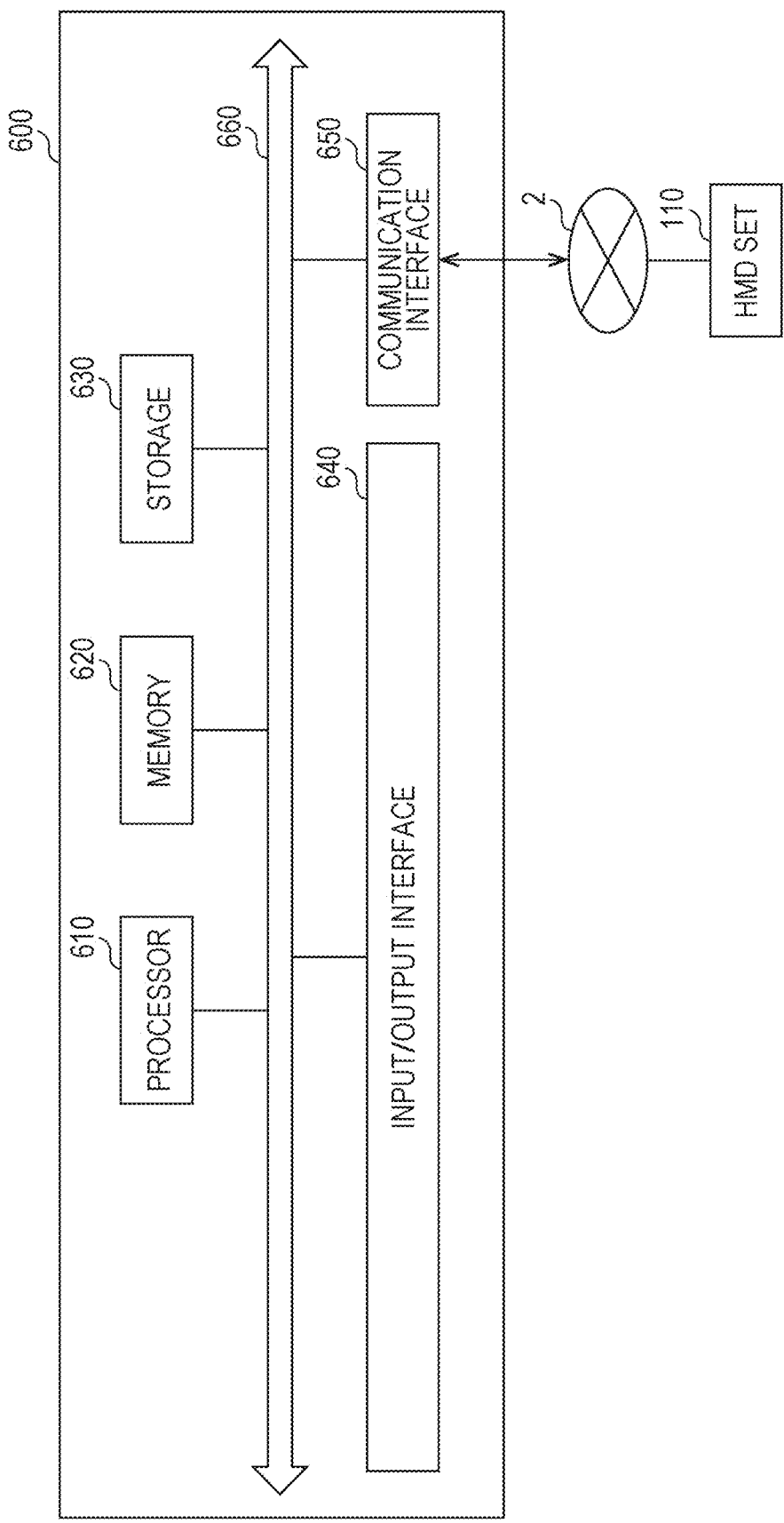
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
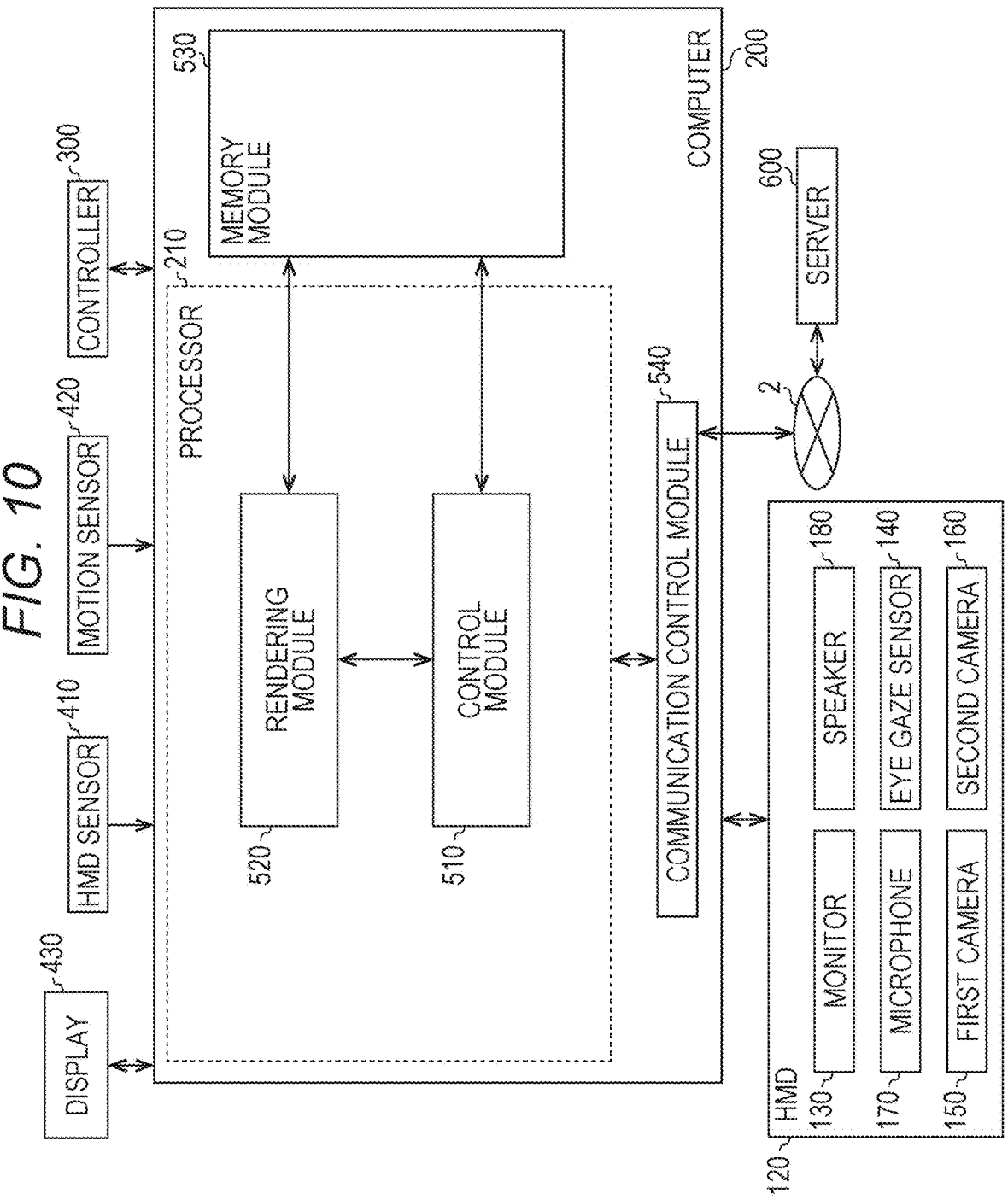
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
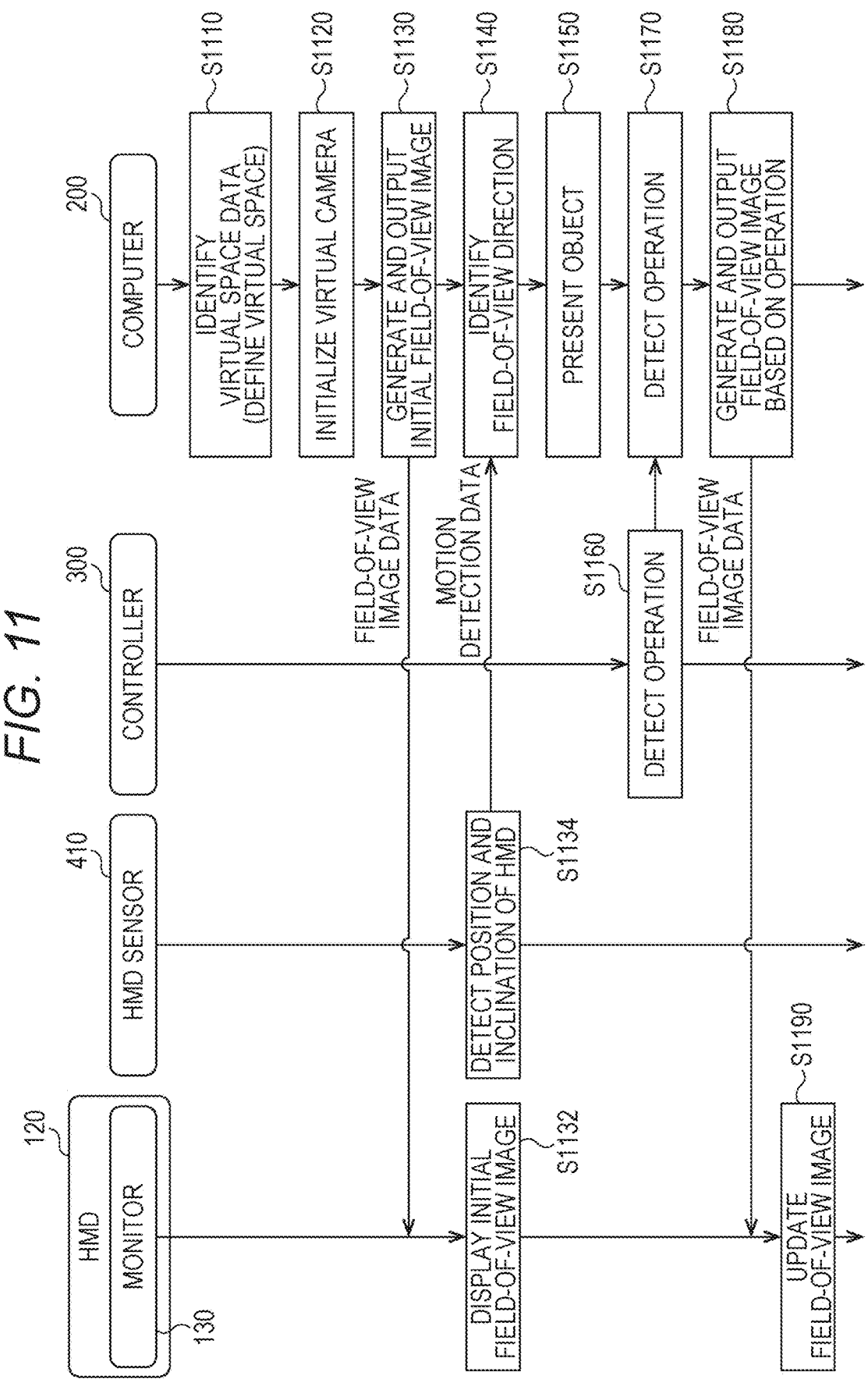
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
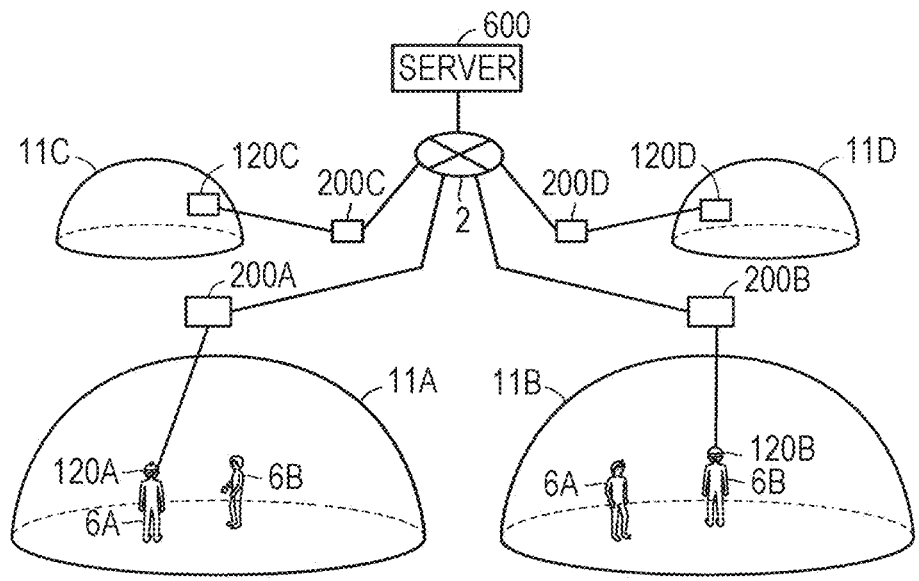
FIG. 12A A schematic diagram of HMD systems of several users sharing the virtual space interact using a network according to at least one embodiment of this disclosure.
Figure 12B:
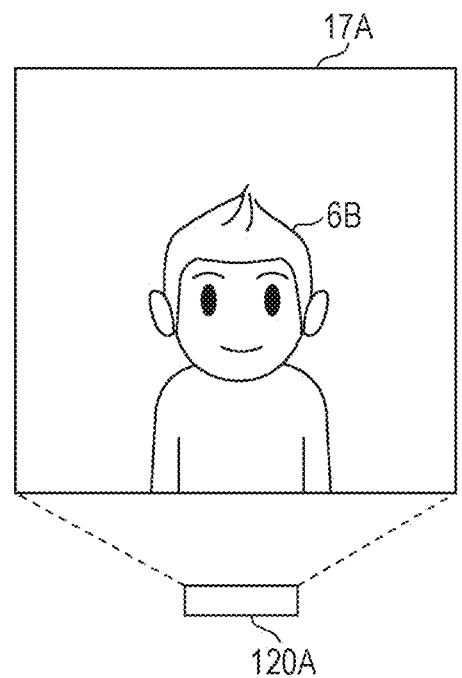
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
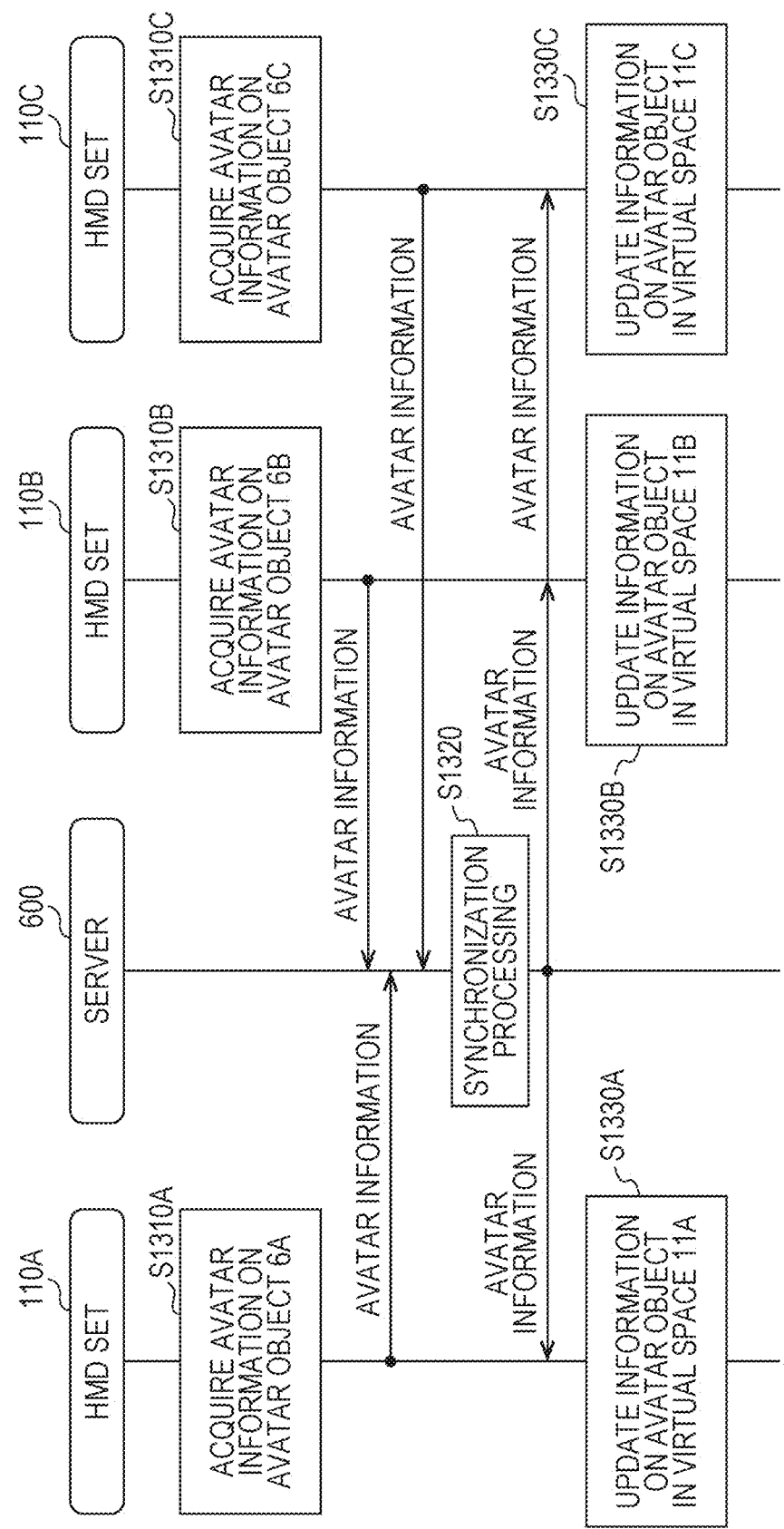
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Description of Control of Operations Among Avatars]

Figure 14:
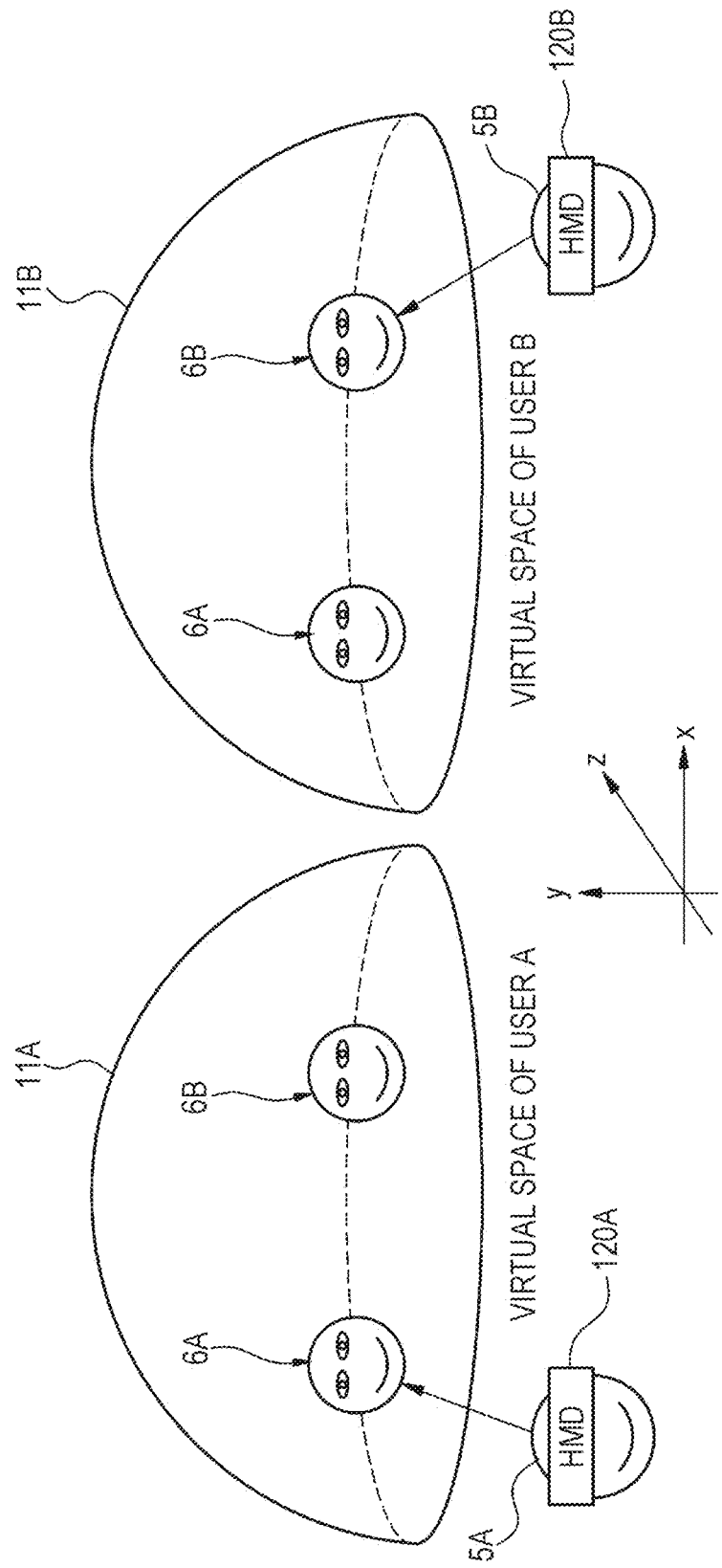
FIG. 14A A diagram of the virtual space constructing virtual experience content according to at least one embodiment of this disclosure.
FIG. 14B A diagram of the virtual space constructing virtual experience content according to at least one embodiment of this disclosure.
Figure 15:
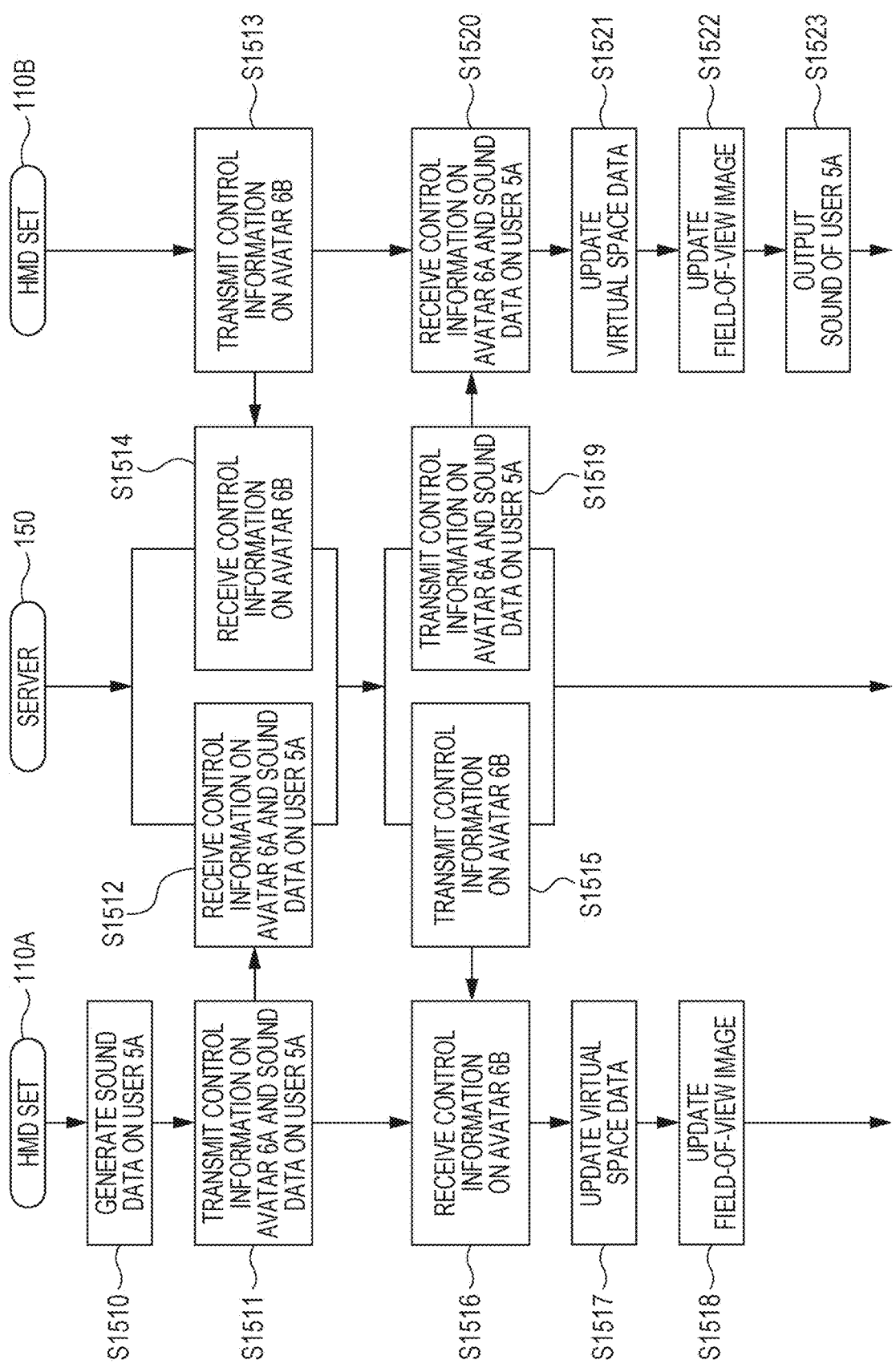
FIG. 15 A flowchart of an operation of a virtual experience content distribution system according to at least one embodiment of this disclosure.

Next, processing of synchronizing control of motions of the avatars 6A and 6B between the HMD set 110A and the HMD set 110B is described with reference to FIG. 1, FIG. 14A, FIG. 14B, and FIG. 15 according to at least one embodiment. FIG. 14A is a diagram of the virtual space 11A to be provided to the user 5A according to at least one embodiment of this disclosure. FIG. 14B is a diagram of the virtual space 11B to be provided to the user 5B according to at least one embodiment of this disclosure. FIG. 15 is a flowchart of synchronizing motions of the avatars 6A and 6B between the HMD set 110A and the HMD set 110B according to at least one embodiment of this disclosure. In FIG.

14A and FIG. 14B, the avatar 6A associated with the HMD set 110A (user 5A) and the avatar 6B associated with the HMD set 110B (user 5B) share the same virtual space. In other words, the user 5A and the user 5B share one virtual space via the network 2.

In FIG. 14A, the virtual space 11A of the user 5A includes the avatar 6A and the avatar 6B. The avatar 6A is operated by the user 5A and moves in association with a motion of the user 5A. The avatar 6A includes: a left hand, which moves in association with a motion (motion of left hand of user 5A) of a controller 300L of the HMD set 110A; a right hand, which moves in association with a motion of a controller 300R of the HMD set 110A; and a face, whose facial expression moves in association with a facial expression of the user 5A. The face of the avatar 6A includes a plurality of face parts (e.g., eyes, eyebrows, and mouth). The avatar 6B is operated by the user 5B and moves in association with a motion of the user 5B. The avatar 6B includes: a left hand, which moves in association with a motion of a controller 300L of the HMD set 110B indicating a motion of a left hand of the user 5B; a right hand, which moves in association with a motion of a controller 300R of the HMD set 110B indicating a motion of a right hand of the user 5B; and a face, whose facial expression moves in association with a facial expression of the user 5B. The face of the avatar 6B includes a plurality of face parts (e.g., eyes, eyebrows, and mouth).

The positions of the avatars 6A and 6B may also be identified based on the positions of the HMDs 120 of the HMD sets 110A and 110B, respectively. Similarly, the directions of the faces of the avatars 6A and 6B may also be identified based on the inclinations of the HMDs 120 of the HMD sets 110A and 110B, respectively. The motions of the hands of the avatars 6A and 6B may also be identified based on motions of the controllers 300 of the HMD sets 110A and 110B, respectively. The facial expressions of the avatars 6A and 6B may be identified based on the facial expressions (states) of the users 5A and 5B. In particular, the positions of the pupil and iris of the avatars 6A and 6B with respect to the sclera may be identified based on the positions of the pupil and iris of the users 5A and 5B with respect to the sclera.

In FIG. 14B, the virtual space 11B of the user 5B includes the avatar 6A and the avatar 6B. The position of each of the avatars 6A and 6B in the virtual space 11A may correspond to the position of each of the avatars 6A and 6B in the virtual space 11B.

Next, in FIG. 15, in Step S1510, the processor 210 of the HMD set 110A generates sound data on the user 5A. For example, when the user 5A has input a voice into the microphone 170 (sound input device) of the HMD set 110A, the microphone 170 generates sound data representing the input voice. After that, the microphone 170 transmits the generated sound data to the computer 200 via the input/output interface 240.

Next, in Step S1511, the processor 210 of the HMD set 110A generates control information on the avatar 6A, and then transmits the generated control information on the avatar 6A and the sound data representing the voice of the user 5A (sound data on user 5A) to the server 150. After that, the processor 610 of the server 150 receives the control information on the avatar 6A and the sound data on the user 5A from the HMD set 110A (Step S1512).

In this case, the control information on the avatar 6A is information required for controlling the motion of the avatar 6A. The control information on the avatar 6A may contain information (position information) on a position of the avatar 6A, information (face direction information) on a direction of the face of the avatar 6A, information (hand information) on states of the hands (left hand and right hand) of the avatar 6A, and information (face information) on the facial expression of the avatar 6A.

The face information on the avatar 6A contains information on states of the plurality of face parts. The information on states of the plurality of face parts contains information (eye information) on states of the eyes (e.g., shape of sclera and position of pupil and iris with respect to sclera) of the avatar 6A, information (eyebrow information) on information of the eyebrows (e.g., positions and shapes of eyebrows) of the avatar 6A, and information (e.g., mouth information) on states of the mouth (e.g., position and shape of mouth) of the avatar 6A.

More specifically, the eye information on the avatar 6A contains information on a state of a left eye of the avatar 6A and information on a state of a right eye of the avatar 6A. The eyebrow information on the avatar 6A contains information on a state of a left eyebrow of the avatar 6A and information on a state of a right eyebrow of the avatar 6A.

The processor 210 of the HMD set 110A acquires an image representing the eyes (left eye and right eye) and eyebrows (left eyebrow and right eyebrow) of the user 5A from the second camera 160 mounted on the HMD 120, and identifies the states of the eyes (left eye and right eye) and eyebrows (left eyebrow and right eyebrow) of the user 5A based on the acquired image and a predetermined image processing algorithm. Next, the processor 210 generates information on the states of the eyes (left eye and right eye) of the avatar 6A and information on the states of the eyebrows (left eyebrow and right eyebrow) of the avatar 6A based on the identified states of the eyes and eyebrows of the user 5A. The information on the position (center position) of the pupil and iris of the user 5A may be acquired by the eye gaze sensor 140 instead of the second camera 160 among the pieces of information indicating the eye state of the user 5A.

Similarly, the processor 210 of the HMD set 110A acquires an image representing the mouth and its surroundings of the user 5A from the first camera 150, and identifies the state of the mouth of the user 5A based on the acquired image and a predetermined image processing algorithm. Next, the processor 210 generates information on the state of the mouth of the avatar 6A based on the identified state of the mouth of the user 5A.

In this manner, the processor 210 of the HMD set 110A can generate the eye information on the avatar 6A corresponding to the eyes of the user 5A, the eyebrow information on the avatar 6A corresponding to the eyebrows of the user 5A, and the mouth information on the avatar 6A corresponding to the mouth of the user 5A.

The processor 210 may identify the facial expression (e.g., smile) of the user 5A from among a plurality of types of facial expressions (e.g., smile, sorrow, poker face, anger, surprise, and confusion) stored in the storage 230 or the memory 220 based on an image photographed by the second camera 160, an image photographed by the first camera 150, and a predetermined image processing algorithm. After that, the processor 210 can generate face information on the facial expression (e.g., smile) of the avatar 6A based on the identified facial expression of the user 5A. In this case, the storage 230 may store facial expression data containing the plurality of types of facial expressions of the avatar 6A and a plurality of pieces of face information on the avatar 6A associated with the plurality of types of facial expressions, respectively.

For example, when the processor 210 identifies that the facial expression of the avatar 6A is a smile, the processor 210 acquires face information representing a smile. The facial expression representing a smile of the avatar 6A contains eye information, eyebrow information, and mouth information on the avatar 6A at a time when the facial expression of the avatar 6A is a smile.

Next, in Step S1513, the processor 210 of the HMD set 110B generates control information on the avatar 6B, and then transmits the generated control information on the avatar 6B to the server 150. After that, the processor 610 of the server 150 receives the control information on the avatar 6B from the HMD set 110B (Step S1514).

In this case, the control information on the avatar 6B is information required for controlling the motion of the avatar 6B. The control information on the avatar 6B may contain information (position information) on a position of the avatar 6B, information (face direction information) on a direction of the face of the avatar 6B, information (hand information) on states of the hands (left hand and right hand) of the avatar 6B, and information (face information) on the facial expression of the avatar 6B.

The face information on the avatar 6B contains information on states of the plurality of face parts. The information on states of the plurality of face parts contains information (eye information) on states of the eyes (e.g., shape of sclera and position of pupil and iris with respect to sclera) of the avatar 6B, information (eyebrow information) on information of the eyebrows (e.g., positions and shapes of eyebrows) of the avatar 6B, and information (e.g., mouth information) on states of the mouth (e.g., position and shape of mouth) of the avatar 6B. The method of acquiring the face information on the avatar 6B is the same as the method of acquiring the face information on the avatar 6A.

Next, the server 150 transmits control information on the avatar 6B to the HMD set 110A (Step S1515), and transmits the control information on the avatar 6A and the sound data on the user 5A to the HMD set 110B (Step S1519). After that, in Step S1516, the processor 210 of the HMD set 110A receives the control information on the avatar 6B, and then updates the states of the avatars 6A and 6B to update the virtual space data representing the virtual space 11A (see FIG. 14A) based on the control information on the avatars 6A and 6B (Step S1517).

Specifically, the processor 210 of the HMD set 110A updates the positions of the avatars 6A and 6B based on the position information on the avatars 6A and 6B. The processor 210 updates the directions of the faces of the avatars 6A and 6B based on face direction information on the avatars 6A and 6B. The processor 210 updates the hands of the avatars 6A and 6B based on the hand information on the avatars 6A and 6B. The processor 210 updates the facial expressions of the avatars 6A and 6B based on the face information on the avatars 6A and 6B. In this manner, the virtual space data representing the virtual space 11A including the updated avatars 6A and 6B is updated.

After that, the processor 210 of the HMD set 110A identifies a field of view CV of the avatar 6A (virtual camera 14) based on the position and inclination of the HMD 120, and then updates the field-of-view image displayed on the HMD 120 based on the updated virtual space data and the field of view CV of the avatar 6A (Step S1518).

Meanwhile, in Step S1520, the processor 210 of the HMD set 110B receives the control information on the avatar 6A and the sound data on the user 5A, and then updates the states of the avatars 6A and 6B to update the virtual space data representing the virtual space 11B (see FIG. 14B) based on the control information on the avatars 6A and 6B (Step S1521).

Specifically, the processor 210 of the HMD set 110B updates the positions of the avatars 6A and 6B based on the position information on the avatars 6A and 6B. The processor 210 updates the directions of the faces of the avatars 6A and 6B based on face direction information on the avatars 6A and 6B. The processor 210 updates the hands of the avatars 6A and 6B based on the hand information on the avatars 6A and 6B. The processor 210 updates the facial expressions of the avatars 6A and 6B based on the face information on the avatars 6A and 6B. In this manner, virtual space data representing the virtual space including the updated avatars 6A and 6B is updated.

After that, the processor 210 of the HMD set 110B identifies a field of view CV of the avatar 6B (virtual camera 14) based on the position and inclination of the HMD 120, and then updates the field-of-view image displayed on the HMD 120 based on the updated virtual space data and the field of view CV of the avatar 6B (Step S1522).

Next, the processor 210 of the HMD set 110B processes the sound data on the user 5A based on the received sound data on the user 5A, the information on the position of the avatar 6A included in the control information on the avatar 6A, the information on the position of the avatar 6B, and a predetermined voice processing algorithm. After that, the processor 210 transmits the processed sound data to the speaker 180 (voice output device), and the speaker 180 outputs the voice of the user 5A based on the processed sound data (Step S1523). In this way, a voice chat (VR chat) can be implemented between users (between avatars) in the virtual space.

In at least one embodiment, after the HMD sets 110A and 110B have transmitted the control information on the avatar 6A and the control information on the avatar 6B, respectively, to the server 150, the server 150 transmits the control information on the avatar 6A to the HMD set 110B, and transmits the control information on the avatar 6B to the HMD set 110A. In this way, the motion of each of the avatars 6A and 6B can be synchronized between the HMD set 110A and the HMD set 110B.

Figure 16:
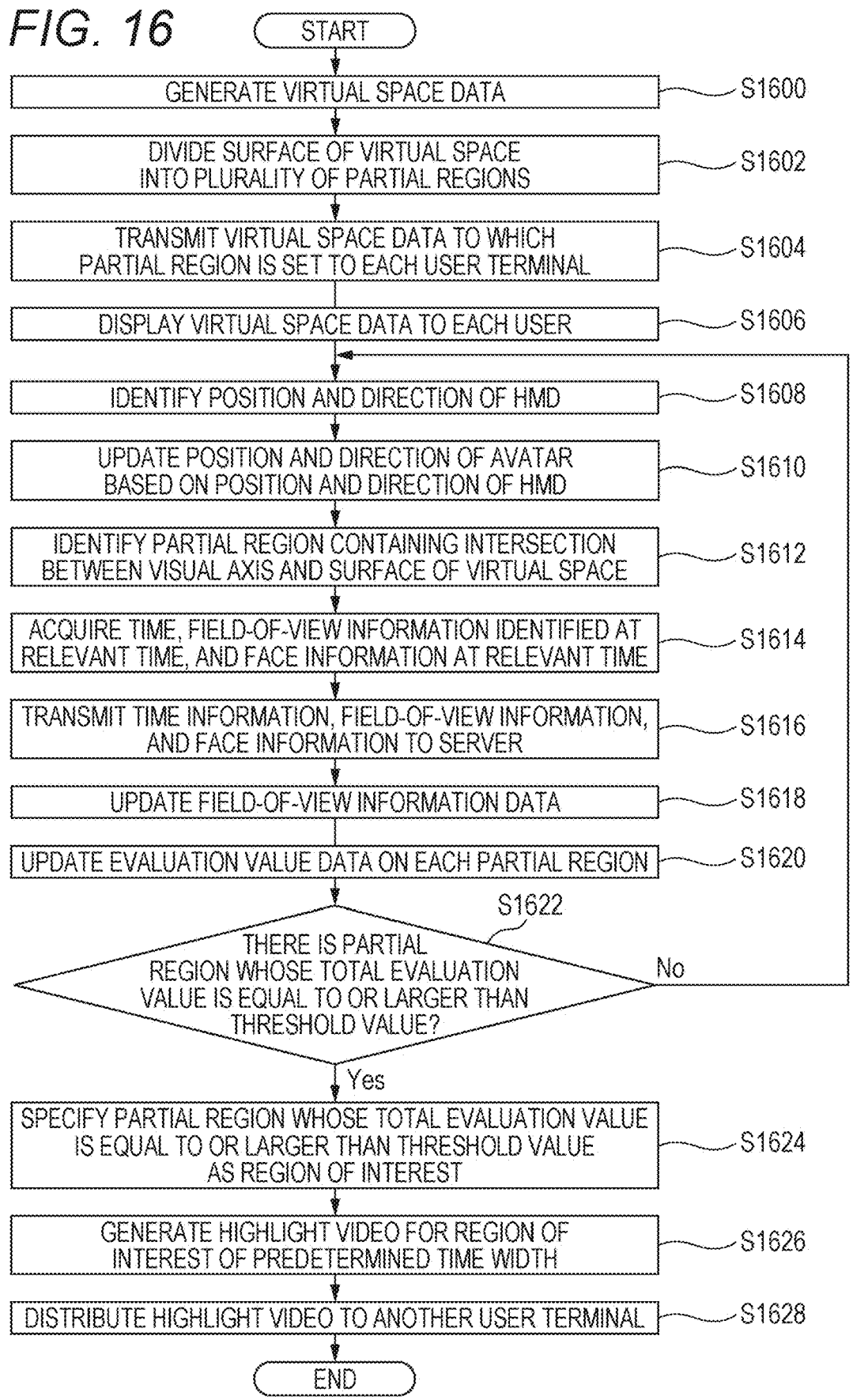
FIG. 16 A flowchart of an operation of the virtual experience content distribution system according to at least one embodiment of this disclosure.
Figure 17:
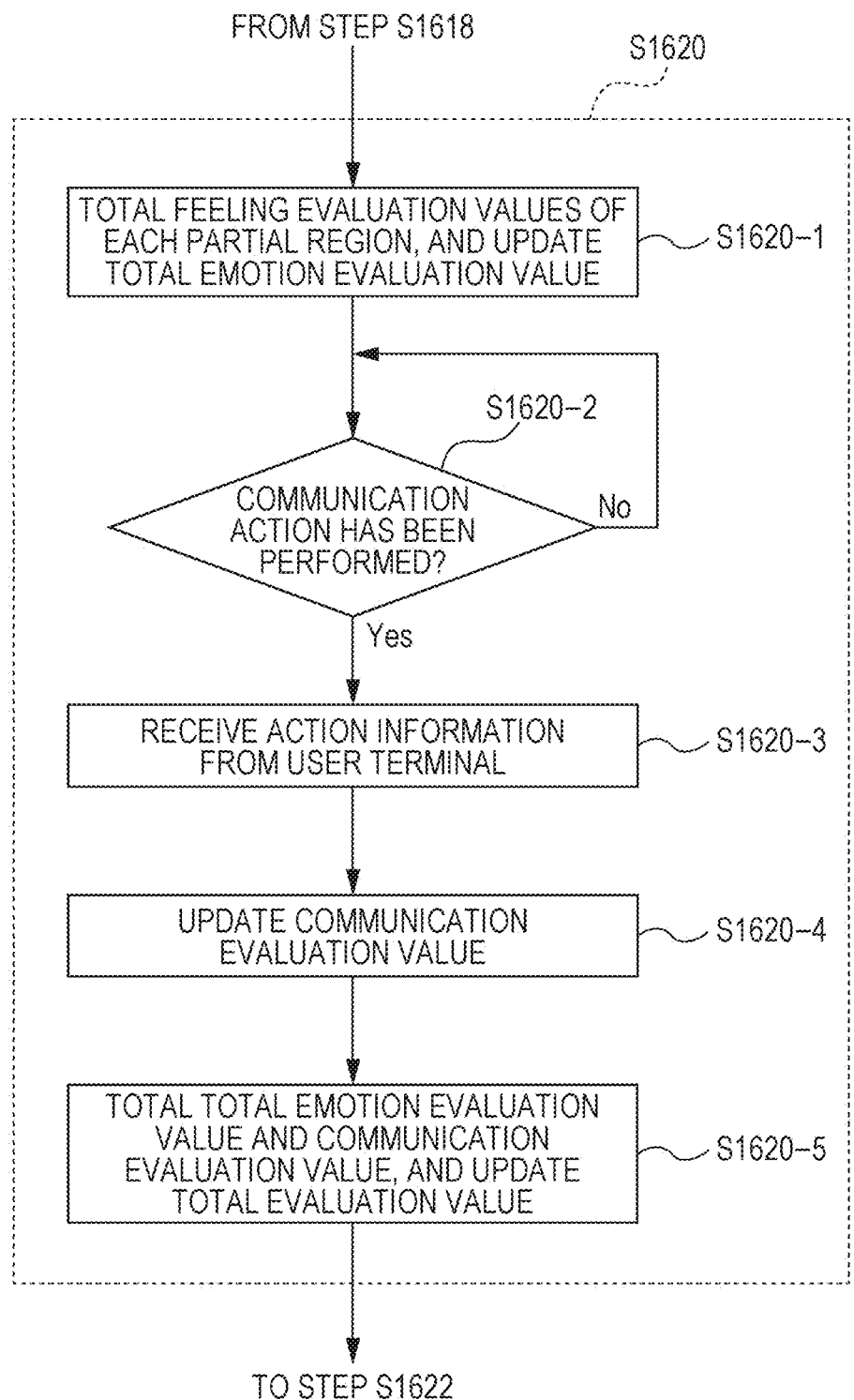
FIG. 17 A flowchart of updating evaluation value data on each partial region according to at least one embodiment of this disclosure.
Figure 18:
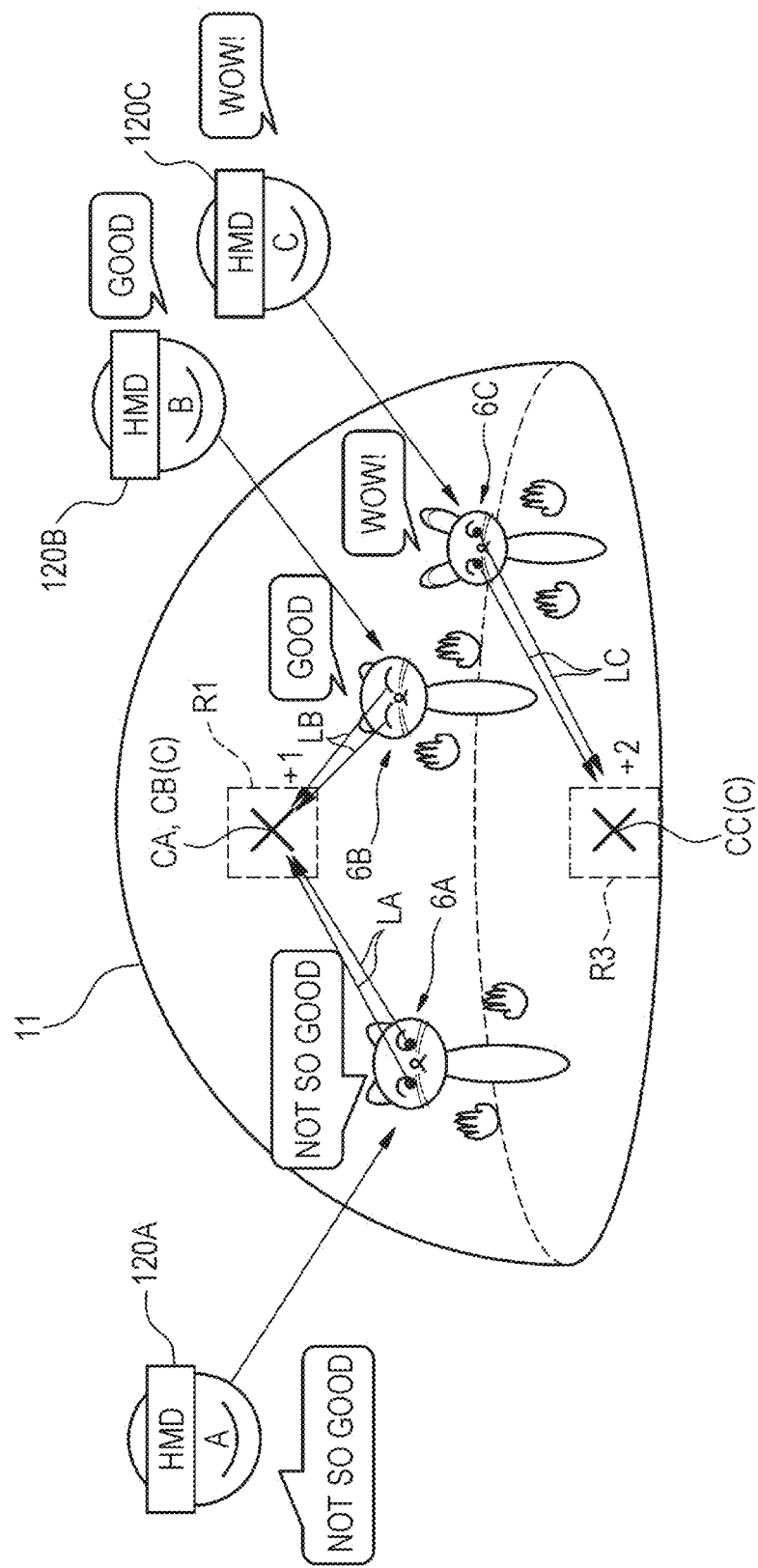
FIG. 18 A diagram of the virtual space constructing the virtual experience content according to at least one embodiment of this disclosure.
Figure 19:
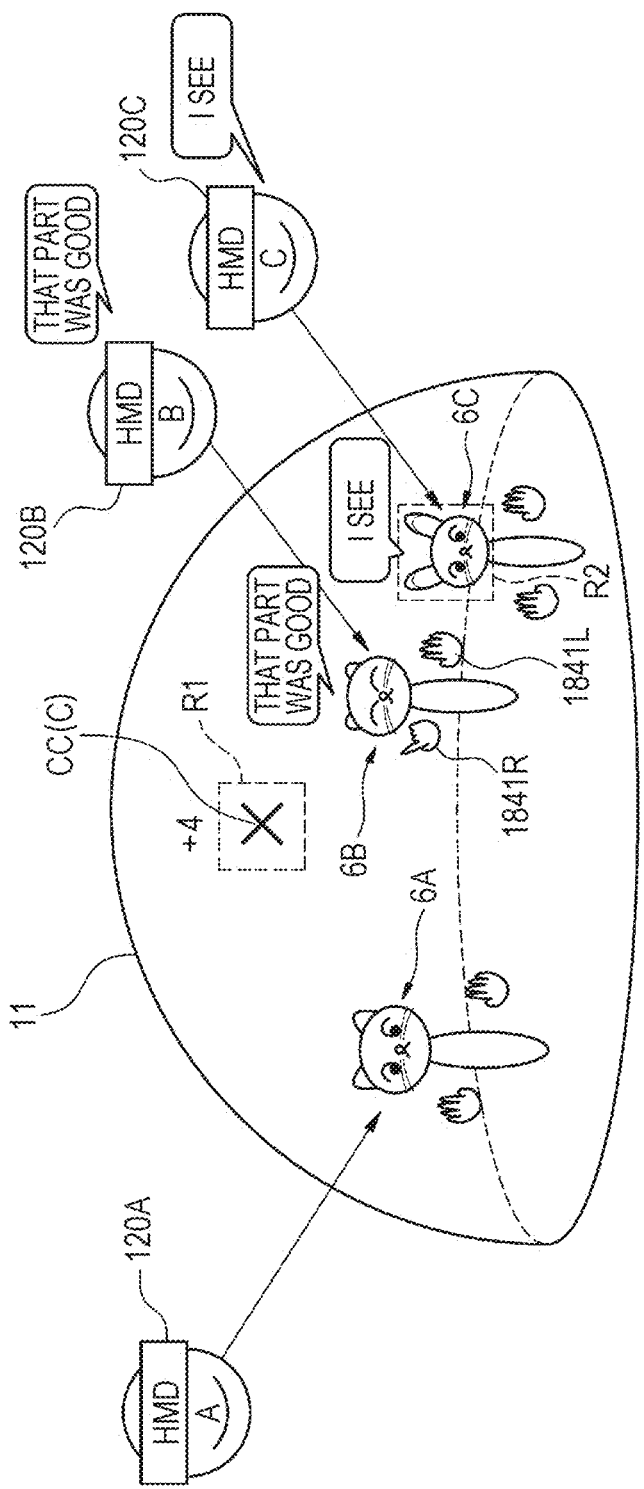
FIG. 19 A diagram of the virtual space constructing the virtual experience content according to at least one embodiment of this disclosure.
Figure 20:
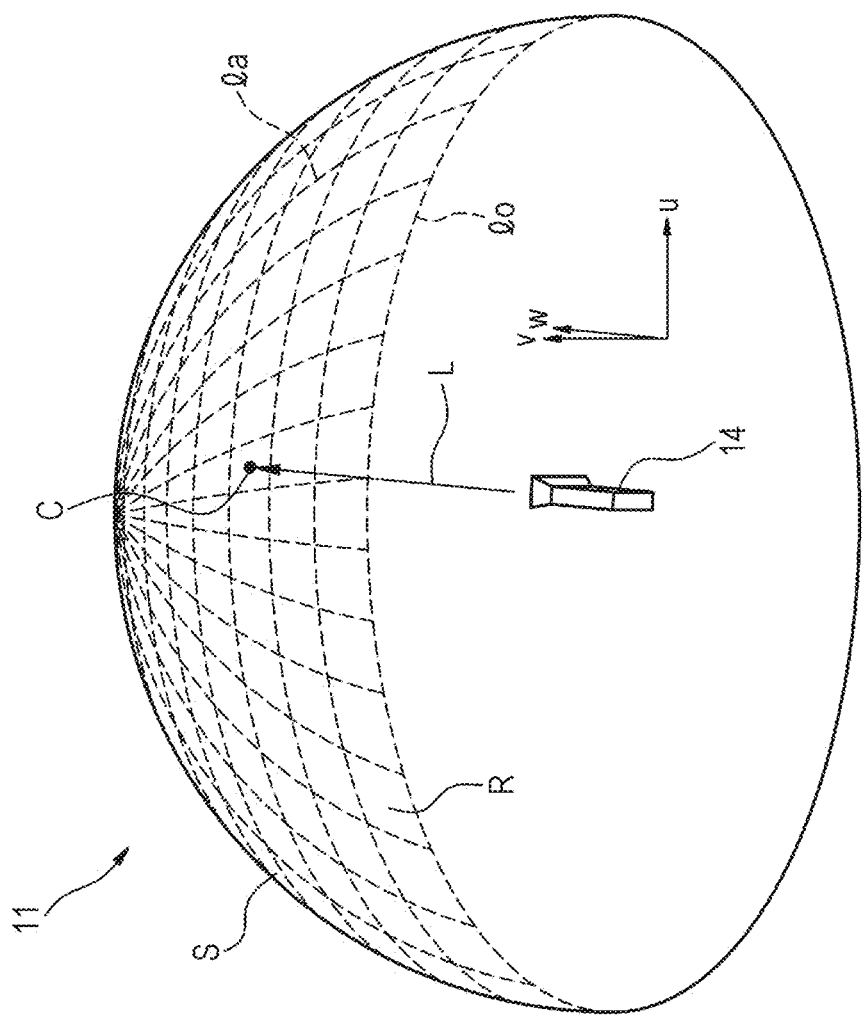
FIG. 20 An xyz spatial diagram of an example of the virtual space according to at least one embodiment of this disclosure.
Figure 21:
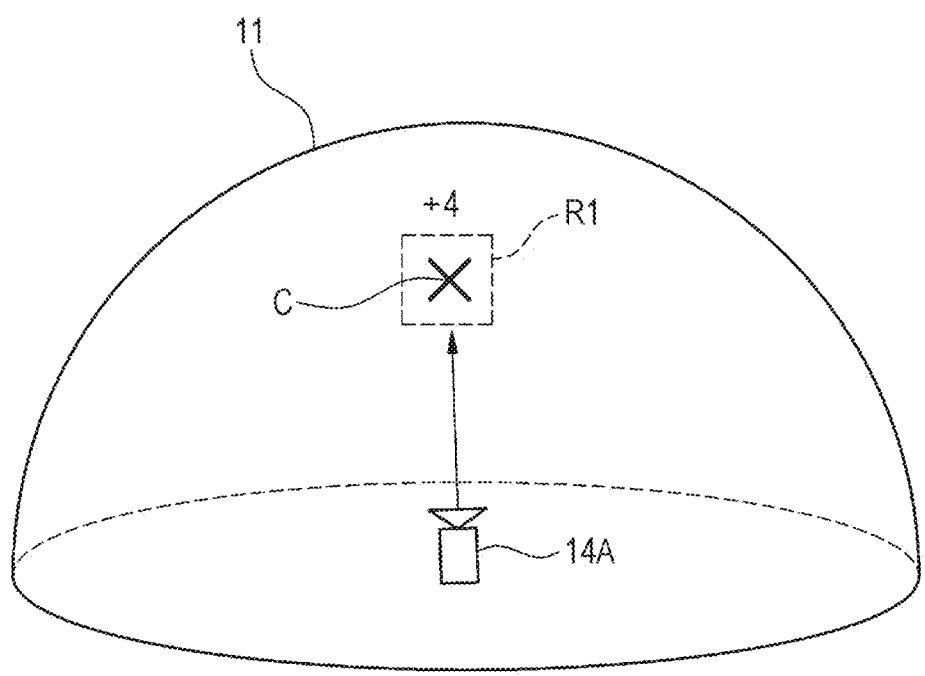
FIG. 21 A schematic diagram of a configuration of arranging virtual cameras in the virtual space according to at least one embodiment of this disclosure.

Next, referring to FIG. 16 to FIG. 20, an information processing method according to at least one embodiment of this disclosure is described. FIG. 16 and FIG. 17 are flowcharts of the information processing method according to at least one embodiment. FIG. 18 is a schematic diagram of a method of updating an evaluation value for each partial region of the virtual space 11 according to at least one embodiment. FIG. 20 is an xyz spatial diagram of the virtual space according to at least one embodiment. In at least one embodiment, the avatar 6A associated with the HMD set 110A (user 5A), the avatar 6B associated with the HMD set 110B (user 5B), and the avatar 6C associated with the HMD set 110C (user 5C) share the same virtual space 11. That is, the user 5A, the user 5B, and the user 5C share the same virtual space 11 via the network 11. Although not shown, the virtual camera 14 corresponding to the HMD 120 of the HMD set 110A is arranged in association with the avatar 6A in the virtual space 11, the virtual camera 14 corresponding to the HMD 120 of the HMD set 110B is arranged in association with the avatar 6B in the virtual space 11, and the virtual camera 14 corresponding to the HMD 120 of the HMD set 110C is arranged in association with the avatar 6C in the virtual space 11. That is, the positions and/or directions of the respective avatars 6A, 6B, and 6C are changed based on movement of the HMDs 120 of the respective HMD sets 110A, 110B, and 110C.

In FIG. 20, for the sake of description, inclusion of a plurality of latitude lines lo and longitude lines la is omitted on a front side (−z side) of a surface S of the virtual space 11, whereas the plurality of latitude lines lo and longitude lines la and a plurality of partial regions R are included on a back side (+Z side) of the surface S of the virtual space 11. In FIG. 18, inclusion of the latitude lines lo, the longitude lines la, and the plurality of partial regions R on the surface of the virtual space 11 is omitted.

The server 150 according to at least one embodiment may provide the HMD sets 110A and 110B or terminals (e.g., personal computer or tablet terminal) other than the HMD sets 110A and 110B with a video distribution service via an application executed on a web browser. The storage 630 may store an application for providing a video distribution service. The application stored in the storage 630 is distributed to a terminal device in response to a distribution request. The terminal device can download an application from, for example, a server (e.g., server for providing application market) other than the server 150.

In this manner, the server 150 can manage a website for providing a video distribution service, and distribute a webpage (HTML data) constructing the website in response to a request from the terminal device. The server 150 can transmit and receive various kinds of data (containing data required for display of screen) required for provision of the video distribution service to and from the terminal device. The server 150 can store various kinds of data for each piece of identification information (e.g., user ID) for identifying each user, and manage the status of provision of the video distribution service for each user. Although not described in detail, the server 150 can also have a function for performing, for example, authentication processing or charging processing for the user.

In FIG. 16, in Step S1600, the processor 610 of the server 150 generates virtual space data representing the virtual space 11. Specifically, the processor 610 reads virtual experience content (360-degree content) stored in the storage 630 in response to input signals from the HMD sets 110A, 110B, and 110C, and generates virtual space data containing the virtual space or a 360-degree spatial image, for example, an omnidirectional image. The 360-degree content may contain a 360-degree moving image. The 360-degree content may contain, for example, different pieces of content for a plurality of regions of the 360-degree moving image. With this, the users 5A, 5B, and 5C sharing the virtual space 11 can view various regions in the virtual space 11 and recommend points of interest to other users, to thereby enjoy communication among the avatars 6A, 6B, and 6C.

Next, in Step S1602, the processor 610 uses the plurality of latitude lines lo arranged at predetermined angle intervals and the plurality of longitude lines la arranged at predetermined angle intervals, to divide the surface S of the virtual space 11 into the plurality of partial regions R. In other words, the processor 610 sets grids formed of the latitude line lo and the longitude line la on the hemispherical surface S of the virtual space 11, to thereby set the plurality of partial regions R on the surface S (refer to FIG. 20).

The number of latitude lines lo is set depending on an angle interval between the adjacent latitude lines lo. For example, when the angle interval between the adjacent latitude lines lo is 15 degrees, (90 degrees÷15 degrees)−1=5 is obtained, and the number of latitude lines to is set to 5. Similarly, the number of longitude lines la is set depending on an angle interval between the adjacent longitude lines la. For example, when the angle interval between the adjacent longitude lines la is 15 degrees, 360 degrees÷15 degrees=24 is obtained, and the number of longitude lines la is set to 24. The controller 121 can appropriately set the number of latitude lines lo and the number of longitude lines la depending on the type of virtual space data.

The number of partial regions R is determined based on the number of longitude lines la and the number of latitude lines lo. For example, when the number of lines of longitude lines la is n, and the number of lines of latitude lines lo is m, the total number N of partial regions R is N=n×(m+1) (n≥2).

Next, in Step S1604, the processor 610 of the server 150 transmits the virtual space data in a state in which the plurality of partial regions R are set to the surface S of the virtual space 11 to each of the HMD sets 110A, 110B, and 110C. Next, in Step S1606, the processors 210 of the respective HMD sets 110A, 110B, and 110C display the virtual space data distributed from the processor 610 of the server 150 on the monitor 130.

Next, in Step S1608, the processors 210 of the respective HMD sets 110A, 110B, and 110C identify the positions and directions of the respective HMDs 120. Specifically, the processor 210 receives data representing the state of the HMD 120 from the sensor 190 and/or the HMD sensor 410, to thereby identify the position and direction of the HMD 120. Alternatively, the processor 210 may acquire information on the position and inclination of the HMD 120 based on data representing the state of the HMD 120 transmitted from the sensor 190 and/or the HMD sensor 410.

Next, in Step S1610, the processors 210 of the respective HMD sets 110A, 110B, and 110C update the positions and directions of the avatars 6A, 6B, and 6C (virtual cameras 14) in the virtual space 11 based on the positions and directions of the HMDs 120, and determine the positions of intersections C at which the line-of-sight directions (visual axes L) of the respective avatars 6A, 6B, and 6C and the surface S of the virtual space 11 intersect with one another. For example, the intersection C is determined based on a radius r of the virtual space 11 and a latitude θ and a longitude φ of the visual axis L illustrated in FIG. 20. The radius r of the virtual space 11 is a known value, and thus the processor 210 determines the intersection C based on the latitude θ and the longitude φ of the visual axis L. The visual axis L is determined based on the positions of the respective avatar 6A, 6B, and 6C and the directions of the lines of sight of the respective avatars 6A, 6B, and 6C.

In Step S1610, the processors 210 of the HMD sets 110A, 110B, 110C identify the line-of-sight directions of the respective avatars 6A, 6B, and 6C based on the positions and directions of the HMDs 120. However, instead, the line-of-sight directions of the respective avatars 6A, 6B, and 6C may be identified based on the lines of sight of the respective users 5A, 5B, and 5C. In this case, the processor 210 may receive information from the eye gaze sensor 140 to determine that the line of sight of each user 5A, 5B, or 5C has changed. Alternatively, the processor 210 may acquire information on the line of sight of each user 5A, 5B, or 5C based on the information transmitted from the eye gaze sensor 140, and determine whether the line of sight of each user 5A, 5B, or 5C has changed based on the acquired information.

Next, in Step S1612, the processors 210 of the respective HMD sets 110A, 110B, and 110C identify a partial region containing the intersection C among the plurality of partial regions R obtained by dividing the surface S of the virtual space 11. The partial regions R are set by the plurality of latitude lines lo and the plurality of longitude lines la, and thus each partial region R has an angle range of the latitude θ and the longitude φ. As described above, the intersection C is determined based on the latitude θ and the longitude φ of the visual axis L. In this manner, the processor 210 can determine the latitude θ and the longitude φ of the moved visual axis L, to thereby determine which partial region R contains the intersection C without performing a complex calculation.

and sound information to the server 150. Next, in Step S1618, the server 150 updates the field-of-view information data stored in the storage 630. The field-of-view information data, according to at least one embodiment, is shown below.

TABLE 1

| | Avatar 6A | | | Avatar 6B | | | Avatar 6C | | |
|---|---|---|---|---|---|---|---|---|---|
| Time information | Field-of-view information | Emotion information | Emotion evaluation value | Field-of-view information | Emotion information | Emotion evaluation value | Field-of-view information | Emotion information | Emotion evaluation value |
| T1 | R1 | Poker face | −1 | R1 | Smile | +1 | R3 | Surprised face | +2 |
| T2 | R1 | Poker face | −1 | R1 | Smile | +1 | R3 | Surprised face | +2 |
| T3 | R1 | Poker face | −1 | R2 | Smile | +1 | R3 | Surprised face | +2 |
| T4 | R1 | Poker face | −1 | R2 | Smile | +1 | R3 | Surprised face | +2 |
| T5 | R1 | Poker face | −1 | R1 | Smile | +1 | R3 | Smile | +1 |

The line-of-sight directions (visual axes L) of the respective avatars 6A, 6B, and 6C may frequently change, and thus, in Step S1612, field-of-view information (information representing partial regions indicated by line-of-sight directions of respective avatars 6A, 6B, and 6C) representing the partial region R containing the intersection C at each time is identified in association with time information for defining a time. The time information may be defined in association with the real time, or may be defined as a period of time that has elapsed since a time at which the 360-degree content transmitted to each of the HMD sets 110A, 110B, and 110C as the virtual space data was started to be played back.

For example, the processor 210 of the HMD set 110A identifies, in association with the time information, the partial region R (partial region R1 in FIG. 18) containing an intersection CA, at which a line-of-sight direction LA of the avatar 6A and the surface S of the virtual space 11 intersect with each other in association with the time information. Similarly, the processor 210 of the HMD set 110B identifies, in association with the time information, the partial region R (partial region R1 in FIG. 18) containing an intersection CB, at which a line-of-sight direction LB of the avatar 6B and the surface S of the virtual space 11 intersect with each other. Similarly, the processor 210 of the HMD set 110C identifies, in association with the time information, the partial region R (partial region R3 in FIG. 18) containing an intersection CC, at which a line-of-sight direction LC of the avatar 6C and the surface S of the virtual space 11 intersect with each other.

Next, in Step S1614, the processors 210 of the respective HMD sets 110A, 110B, and 110C acquire face information on the avatars 6A, 6B, and 6C at each time and sound information on the avatars 6A, 6B, and 6C at each time. As described above, the processors 210 identify the facial expressions of the respective avatars 6A, 6B, and 6C based on images obtained by photographing by the second camera 160 and the first camera 150, and acquire the face information based on the identified facial expressions. The processors 210 receive sound data generated based on sounds uttered by the respective users 5A, 5B, and 5C from the microphone 170, and acquire the sound information based on the received sound data.

Next, in Step S1616, the processors 210 of the respective HMD sets 110A, 110B, and 110C transmit the acquired time information, field-of-view information, face information, The field-of-view information data shown in Table 1 contains the time information, and the field-of-view information, emotion information, and emotional evaluation value of each of the avatars 6A, 6B, and 6C at each time. The emotion information is identified based on the face information and sound information on the avatars 6A, 6B, and 6C. The emotion information may be identified based on at least only one of the face information and sound information. The emotional evaluation value is determined based on the emotion information on the avatars 6A, 6B, and 6C and an attribute of the 360-degree content. For example, in a case where the 360-degree content distributed to the virtual space 11 is an entertainment program (e.g., comedy program or quiz program) or an entertainment movie, the emotional evaluation value may be positive when the emotion information represents a smile or a surprised face, whereas the emotional evaluation value may be negative when the emotion information represents a poker face or an angry face. In other cases, when the 360-degree content is a serious drama or a movie focused on social issues, the emotion evaluation value may be positive when the emotion information represents a sorrow face or surprised face. The emotion evaluation value may not be assigned a value at the time of specific emotion information (e.g., poker face). In at least one embodiment, the emotion evaluation value is assigned "+1" when the emotion information represents a smile, the emotion evaluation value is assigned "+2" when the emotion information represents a surprised face, and the emotion evaluation value is assigned "−1" when the emotion information represents a poker face.

In FIG. 18, the avatar 6A is gazing at the partial region R1 during a time T1 to a time T5 (intersection CA is contained in partial region R1 during time T1 to time T5), and the face information of the avatar 6A represents a poker face during the time T1 to the time T5. Further, the user 5A has uttered a voice "Not so good" at a predetermined time (e.g., time T2) during the time T1 to the time T5. In this case, the processor 610 of the server 150, which has received the time information and the field-of-view information from the processor 210 of the HMD set 110A, identifies the field-of-view information on the avatar 6A during the time T1 to the time T5 as the partial region R1, and updates the field-of-view information on the avatar 6A during the time T1 to the time T5 of the field-of-view information shown in Table 1. Further, the processor 610 identifies feeling information on the avatar 6A of Table 1 based on the face information on the avatar 6A at each time of the time T1 to the time T5 and the sound information on the user 5A at the time T2, which are received from the processor 210 of the HMD set 110A. At this time, the processor 610 can analyze the language of the received sound information, and adjust the feeling information based on a result of analysis of the sound information. In at least one embodiment, a determination is made that the sound information of "Not so good" is not a positive evaluation nor a negative evaluation. Thus, the processor 210 identifies the feeling information on the avatar 6A during the time T1 to the time T5 as "poker face" based on the face information (poker face) on the avatar 6A during the time T1 to the time T5 and the sound information indicating an evaluation of zero (refer to Table 1). Then, the processor 610 updates the feeling evaluation value of the avatar 6A based on the identified feeling information and the attribute of the 360-degree content distributed to the virtual space 11. For example, when the 360-degree content distributed to the virtual space 11 is an entertainment program, the processor 610 updates the feeling evaluation value of the avatar 6A during the time T1 to the time T5 to "−1" based on the fact that the feeling information on the avatar 6A indicates a poker face.

In FIG. 18, the avatar 6B gazes at the partial region R1 at the times T1 and T2, then, in FIG. 19, the avatar 6B faces toward the avatar 6C (partial region R2) at the times T3 and 14, and then, the avatar 6B gazes at the partial region R1 at the time T5 again. The facial information on the avatar 6B indicates a smile during the time T1 to the time T5. In at least one embodiment, the user 5B has uttered a voice "Good" at a predetermined time (e.g., time T2) during the time T1 to the time T5. In this case, the processor 610 of the server 150, which has received the time information and the field-of-view information from the processor 210 of the HMD set 110B, identifies the field-of-view information on the avatar 6B at the times T1, T2, and T5 as the partial region R1, and identifies the field-of-view information on the avatar 6B at the times T3 and T4 as the partial region R2 to update the field-of-view information on the avatar 6B at the time T1 to the time T5 of the field-of-view information data shown in Table 1. Further, the processor 610 identifies feeling information on the avatar 6B of Table 1 based on the face information on the avatar 6B at each time of the time T1 to the time T5 and the sound information on the user 5B at the time T2, which are received from the processor 210 of the HMD set 110B. In at least one embodiment, a determination is made that the sound information of "Good" is a positive evaluation. Thus, the controller 121 identifies the feeling information on the avatar 6B during the time T1 to the time T5 as "smile" based on the face information (smile) on the avatar 6A during the time T1 to the time T5 and the sound information indicating a positive evaluation (refer to Table 1). Then, the processor 610 updates the feeling evaluation value of the avatar 6B based on the identified feeling information and the attribute of the 360-degree content distributed to the virtual space 11. The 360-degree content distributed to the virtual space 11 is an entertainment program, and thus the processor 610 updates the feeling evaluation value of the avatar 6B during the time T1 to the time T5 to "+1" based on the fact that the feeling information on the avatar 6B indicates a smile.

When the avatar 6B is performing a specific gesture (e.g., gesture of covering mouth of avatar with hand object or gesture of clapping hand objects) while laughing, the processor 610 may determine that the degree of laughing is high, and further increase the feeling evaluation value. That is, the processor 610 may identify the feeling in consideration of the gesture of the hand object in addition to the face information or sound information on the avatar. The degree of laughing may be different depending on the type of gesture. For example, in a case where the face information on the avatar indicates a smile, the processor 610 determines that the degree of laughing is small (chuckling) when there is no specific gesture, and does not further increase the feeling evaluation value. When the gesture of covering the mouth of the avatar with the hand object is performed, the processor 610 determines that the degree of laughing is medium (laughing), and further increases the feeling evaluation value. When the gesture of clapping the hand objects is performed, the processor 610 determines that the degree of laughing is high (guffawing), and further increases the feeling evaluation value compared to the case of laughing.

In FIG. 18, the avatar 6C is gazing at the partial region R3 different from the partial region R1 or the partial region R2 during the time T1 to the time T5. The facial information on the avatar 6C during the time T1 to the time T5 indicates a surprised face. The user 5C has uttered a voice "Wow!" at a predetermined time (e.g., time T2) during the time T1 to the time T5. In this case, the processor 610 of the server 150, which has received the time information and the field-of-view information from the processor 210 of the HMD set 110C, identifies the field-of-view information on the avatar 6C during the time T1 to the time T5 as the partial region R3, and updates the field-of-view information on the avatar 6C during the time T1 to the time T5 of the field-of-view information data shown in Table 1. Further, the processor 610 identifies the feeling information on the avatar 6C of Table 1 based on the face information on the avatar 6C during the time T1 to the time T5 and the sound information on the user 5C at the time T2, which are received from the processor 210 of the HMD set 110C. In the case of this example, for example, it is determined that the sound information of "Wow!" is a positive evaluation. Thus, the processor 610 identifies the feeling information on the avatar 6C during the time T1 to the time T5 as "surprised face" based on the face information (surprised face) on the face information on the avatar 6C during the time T1 to the time T5 and the sound information indicating a positive evaluation (refer to Table 1). Then, the processor 610 updates the feeling evaluation value of the avatar 6C based on the identified feeling information and the attribute of the 360-degree content distributed to the virtual space 11. The 360-degree content distributed to the virtual space 11 is an entertainment program, and thus the processor 610 updates the feeling evaluation value of the avatar 6C during the time T1 to the time T5 to "+2" based on the fact that the feeling information on the avatar 6C during the time T1 to the time T5 indicates a surprised face. When the avatar 6C is performing a specific gesture (e.g., gesture of extending hand objects) while being surprised, the processor 610 may determine that the degree of surprise is high to further increase the feeling evaluation value.

Next, in Step S1620, the server 150 updates the evaluation value data on each partial region. The evaluation value data, according to at least one embodiment, is shown in Table 2.

TABLE 2

| | Region R1 | | | Region R3 | | |
| --- | --- | --- | --- | --- | --- | --- |
| Time information | Total emotion evaluation value | Communication evaluation value | Total evaluation value | Total emotion evaluation value | Communication evaluation value | Total evaluation value |
| T1 | 0 | 0 | 0 | +2 | 0 | +2 |
| T2 | 0 | 0 | 0 | +2 | 0 | +2 |
| T3 | −1 | +4 | +3 | +2 | 0 | +2 |
| T4 | −1 | +4 | +3 | +2 | 0 | +2 |
| T5 | 0 | 0 | 0 | +2 | 0 | +2 |

The evaluation value data is data indicating the evaluation value of each partial region (e.g., partial regions R1 and R3) at each time (e.g., time T1 to time T5). The evaluation value of each partial region includes a total emotion evaluation value, a communication evaluation value, and a total evaluation value obtained by totaling the total emotion evaluation value and the communication evaluation value. The total emotion evaluation value is an evaluation value obtained by totaling feeling evaluation values of the plurality of avatars 6A, 6B, and 6C at each time (time T1 to time T5). The communication evaluation value is, for example, an evaluation value associated with an action of communication among the avatars 6A, 6B, and 6C in the virtual space 11. The communication action may include, for example, conversation among the avatars 6A, 6B, and 6C or motions (e.g., gesture) of the avatars 6A, 6B, 6C. In at least one embodiment, when an avatar has had such a conversation or has performed such a specific gesture as to induce another avatar to gaze at a specific region of the 360-degree content, the processor 610 adds an evaluation value of the partial region corresponding to the specific region.

FIG. 17 is a flowchart of updating evaluation value data on each partial region according to at least one embodiment.

In FIG. 17, first, in Step S1620-1, the processor 610 of the server 150 totals the feeling evaluation values of the plurality of avatars 6A, 6B, and 6C at each time (time T1 to time T5), and updates the total emotion evaluation value of each partial region. Next, in Step S1620-2, the processor 610 determines whether the avatars 6A, 6B, and 6C have performed a communication action. In response to a determination that the avatars 6A, 6B, and 6C have performed a communication action (Yes in Step S1620-2), in Step S1620-3, the processor 610 receives information (hereinafter referred to as "action information") on the communication action from the HMD sets 110A, 110B, and 110C. Then, in Step S1620-4, the processor 610 updates the communication evaluation value based on the action information.

Now, a description is given of the action of communication among the avatars 6A, 6B, and 6C with reference to FIG. 19.

In FIG. 19, the avatar 6B has faced toward the avatar 6C and told "That part was good" while pointing at the partial region R1 by a right hand object 1841R during the time T3 to the time 14. At this time, the processor 210 of the HMD set 110B transmits the conversation information indicating "That part was good" and the gesture (gesture information) of pointing at the partial region R1 by the right hand object 1841R to the server 150 together with the time information. The processor 610 of the server 150 analyzes the language of the conversation information received from the HMD set 110B, and determines whether the communication action has been performed based on the result of analyzing the conversation information and the gesture information. In this determination, various expressions contained in the conversation information on the avatar 6A, for example, a language expression (demonstrative) indicating a specific region or a tense expression is extracted to analyze the conversation information. In at least one embodiment, when the conversation information indicates "That part was good", the processor 610 determines that the demonstrative of "that part" indicates the partial region R1 based on the gesture information on the avatar 6B. Further, the phrase "was good" contains a past tense expression, and thus the processor 610 determines that the avatar 6B has performed a communication action associated with the partial region R1 on the avatar 6C. Then, the processor 610 sets the communication evaluation value of the partial region R1 to, for example, "+2" for the time (e.g., time of utterance, namely, time T3 to time T4) at which the avatar 6B has performed a communication action on the avatar 6C. When the conversation information contains a present tense or past tense expression, a demonstrative (e.g., "that part") contained in the conversation information cannot be always said to indicate the partial region R1, and thus the partial region R may not be given a positive communication evaluation value.

In FIG. 19, the avatar 6C, who was told by the avatar 6B that "That part was good", has said "I see" to the avatar 6B in response. In this case, the processor 210 of the HMD set 110C transmits the conversation information of "I see" to the server 150 together with the field-of-view information on the avatar 6C. The processor 610 of the server 150 analyzes the language of the conversation information received from the HMD set 110C, and determines that the avatar 6C has uttered a voice indicating an agreement to the utterance of the avatar 6B based on the result of analysis and the field-of-view information. This utterance by the avatar 6C does not contain a demonstrative indicating a specific partial region, and is a present tense. Thus, a determination is made that this utterance does not increase the communication evaluation value of a partial region. As a result, the processor 610 does not give a communication evaluation value to the response of "I see" by the avatar 6C. When the utterance by the avatar 6C contains a demonstrative indicating a specific partial region, and is a past tense, a determination is made that this utterance is to increase the communication evaluation value of the specific partial region.

Next, in Step S1620-5, the processor 610 of the server 150 totals the total emotion evaluation value and the communication evaluation value identified as described above to update the total evaluation value. In at least one embodiment, as shown in Table 2, the total evaluation value of the partial region R1 at the times T1 and T2 is "0", the total evaluation value of the partial region R1 at the times T3 and T4 of the partial region R1 is "+1", and the total evaluation value of the partial region R1 at the time T5 is "+3".

Returning to FIG. 16, next, in Step S1622, the processor 610 of the server 150 determines whether there is a partial region whose total evaluation value is equal to or larger than a threshold value (e.g., "+3"). In response to a determination that there is no partial region whose total evaluation value is equal to or larger than the threshold value (No in Step S1622), the processing of from Step S1608 is repeated. Meanwhile, in response to a determination that there is a partial region whose total evaluation value is equal to or larger than the threshold value (Yes in Step S1622), in Step S1624, the processor 610 specifies the partial region whose total evaluation value is equal to or larger than the threshold value as a region of interest. In at least one embodiment, in Table 2, the total evaluation value of the partial region R1 at the time T5 is "+4", and thus the controller 23 specifies the partial region R1 at the time T5 as the region of interest.

Next, in Step S1626, the processor 610 of the server 150 generates a video (hereinafter referred to as "video of interest") for the region of interest of a predetermined time width (example of first time width) containing the time whose total evaluation value is equal to or larger than the threshold value. As the video of interest, for example, a video of the partial region R1, which contains the time T5, whose total evaluation value is "+3", and has a length of 5 seconds before and after the time T5, can be generated. In FIG. 20, this video of interest may be generated by photographing the region of interest R1 within the virtual space 11 by the virtual camera 14A for generating a video of interest, which is arranged at the center of a celestial sphere constructing the virtual space 11. The avatars 6A, 6B, and 6C and the virtual cameras 14 associated with those avatars 6A, 6B, and 6C are not necessarily positioned at the center of the celestial sphere constructing the virtual space 11. However, the region of interest can be photographed by the virtual camera 14 arranged at the center of the virtual space 11 to generate the video of interest, to thereby generate an appropriate video of interest from a visible angle. The video of interest may be generated as a three-dimensional video, or may be generated as a two-dimensional video. When a plurality of videos of interest are generated in Step S1626, the processor 610 may generate highlight video content by connecting the plurality of videos of interest.

Next, in Step S1628, the processor 610 of the server 150 distributes the generated highlight video content (or video of interest) to the video distribution service on a web browser via the network 2. At this time, the processor 610 may collect moving image viewing information on a large number of users, refer to viewing history information on each user, identify a user terminal (user ID) whose history data on the region of interest (e.g., partial region R1) is similar to an attribute of the relevant highlight video content, and distribute the highlight video content to the user terminal. In at least one embodiment, the processor 610 estimates a user attribute of each user from the collected viewing history information, and provides the highlight video content to a user whose user attribute is similar to the attribute of the relevant highlight video content. The highlight video content is distributed to, for example, a timeline of a social networking service (e.g., LINE™, Facebook™, or Twitter™) with which each user has registered. In this manner, the processor 610 of the server 150 can pick up a user who is likely to be interested in the relevant highlight video content from a large number of users and recommend the relevant highlight video content to the user, to thereby enhance an advertisement effect of the 360-degree content. When the users 5A, 5B, and 5C, who have worn the HMDs 120 and finished viewing of the 360-degree content, have removed the HMDs 120 and worn the HMDs 120 again to start viewing of another piece of 360-degree content, the processor 610 of the server 150 may display, on the monitors 130 of the HMDs 120 worn by the respective users 5A, 5B, and 5C, highlight videos of various kinds of 360-degree content that suit interests of the respective users 5A, 5B, and 5C as recommended videos based on the history information on the regions of interest of the respective users 5A, 5B, and 5C.

As described above, according to at least one embodiment, the processor 610 of the server 150 identifies the emotions of the users 5A, 5B, and 5C wearing the HMDs 120, and when the identified emotions satisfy a condition (example of first condition) determined in advance, updates the evaluation value of a region (example of first region) in the virtual space 11 that depends on the direction of the HMD 120 at a time of satisfaction of the condition. With this, when specific emotions of the respective users 5A, 5B, and 5C are detected, that time can be identified as a time at which the 360-degree content is exciting, and the evaluation value of the region of interest can be updated depending on the direction (visual field) of the HMDs 120 worn by the respective users 5A, 5B, and 5C at that time. Therefore, the region of interest (range of interest) of the 360-degree content in the virtual space 11 is appropriately identified without missing a true exciting point of the 360-degree content.

When the emotions of the respective users 5A, 5B, and 5C satisfy the first condition, and then communication actions of the users 5A, 5B, and 5C satisfy a predetermined condition (example of second condition), the processor 610 may further update the evaluation value. A specific accuracy of the range of interest is improved by adjusting the importance (attention) of the region of interest based on the communication actions of the users 5A, 5B, and 5C in addition to the emotions of the respective users 5A, 5B, and 5C.

The condition on communication actions of the users 5A, 5B, and 5C may contain a conversation among the plurality of avatars 6A, 6B, and 6C in the virtual space 11. In at least one embodiment, a conversation among the plurality of avatars 6A, 6B, and 6C is used to adjust the importance of the region of interest. The users 5A, 5B, and 5C can directly talk to one another without intervention of the avatars 6A, 6B, and 6C arranged in the virtual space 11. The action of communication among the users 5A, 5B, and 5C in this case may be used for updating the evaluation value. In other cases, the users 5A, 5B, and 5C can directly talk to one another by, for example, making a phone call from the virtual space 11, which is a VR space, to the real space.

The evaluation point may be further updated when a language expression indicating a specific partial region is contained in a conversation among the avatars 6A, 6B, and 6C or the users 5A, 5B, and 5C. The evaluation point may be further updated when a tense expression indicating a time is contained in the conversation among the avatars 6A, 6B, and 6C or the users 5A, 5B, and 5C. The importance of the region of interest is easily adjusted by using various expressions in the conversation in this manner.

Communication actions of the users 5A, 5B, and 5C to be used for updating the evaluation value are not limited to a conversation among the avatars 6A, 6B, and 6C or the users 5A, 5B, and 5C. In at least one embodiment, the evaluation value of a specific partial region may be updated when the user 5A, 5B, and 5C has taken an image (moving image) of the partial region. Further, the evaluation value of a specific region (e.g., partial region R1) may be updated when the user 5A, 5B, or 5C has photographed the region (partial region R1) in the virtual space 11 and posted the photo in a social networking site (SNS). In this manner, photography in the virtual space 11 or posting to an SNS as a communication action is used for adjusting the importance of the region of interest.

In at least one embodiment, the evaluation value of a specific partial region is updated based on the field-of-view information and the face information on the avatars 6A, 6B, and 6C, and in addition, the evaluation value of each partial region R is further updated based on the action of communication among the avatars 6A, 6B, and 6C or the users 5A, 5B, and 5C. However, the manner of update is not limited thereto. In at least one embodiment, the evaluation value of each partial region R may be updated based only on the action of communication among the avatars 6A, 6B, and 6C or the users 5A, 5B, and 5C without updating the evaluation value of each partial region R based on the face information on the avatars 6A, 6B, and 6C.

The above description is not to be read as a restrictive interpretation of the technical scope of this disclosure. The at least one embodiment is merely given as an example, and it is to be understood by a person skilled in the art that various modifications can be made to the at least one embodiment within the scope of this disclosure set forth in the appended claims. Thus, the technical scope of this disclosure is to be defined based on the scope of this disclosure set forth in the appended claims and an equivalent scope thereof.

In order to implement various kinds of processing to be executed by the processor 210 by software, a display control program for executing the display control method according to at least one embodiment on a computer (processor) may be incorporated in advance in the storage 230 or a ROM. Alternatively, the display control program may be stored in a computer-readable storage medium such as a magnetic disk (HDD or floppy disk), an optical disc (e.g., CD-ROM, DVD-ROM, or Blu-ray disc), a magneto-optical disk (e.g., MO), and a flash memory (e.g., SD card, USB memory, or SSD). In this case, a storage medium is connected to the computer 200 so that a program stored in the storage medium is incorporated into the storage 230. Then, the display control program incorporated into the storage 230 is loaded onto a RAM and executed by the processor so that the controller 121 executes the display control method according to at least one embodiment.

The display control program may be downloaded from a computer on the network 2 via the communication interface 250. Also in this case, the downloaded program is incorporated into the storage 230.

In the virtual space data representing the virtual space 11 is updated by the HMD set 110, but the virtual space data may be updated by the server 150. Further, the field-of-view image data corresponding to the field-of-view image is updated by the HMD set 110, but the field-of-view image data may be updated by the server 150. In this case, the HMD set 110 displays the field-of-view image on the HMD 120 based on the field-of-view image data transmitted from the server 150.

In order to implement various types of processing to be executed by the processor 210 of the HMD set 110 by software, a control program for executing various types of processing on a computer (processor) may be incorporated in advance into the storage 230 or the memory. Alternatively, the control program may be stored in a computer-readable storage medium such as a magnetic disk (HDD or floppy disk), an optical disc (e.g., CD-ROM, DVD-ROM, or Blu-ray (trademark) disc), a magneto-optical disk (e.g., MO), and a flash memory (e.g., SD card, USB memory, or SSD). In this case, the storage medium is connected to the computer 200 so that the control program stored in the storage medium is incorporated into the storage 230. Then, the control program incorporated into the storage 230 is loaded onto the RAM and executed by the processor so that the processor 210 executes the various types of processing.

The control program may be downloaded from a computer on the communication network 2 via the communication interface 250. Also in this case, the downloaded program is similarly incorporated into the storage 230.

In at least one embodiment, the virtual space is used to provide the user with a virtual experience such as virtual reality (VR), argumented reality (AR), or mixed reality (MR). When the virtual space provides the VR, background data stored in the memory is used as the background of the virtual space. When the virtual space provides the AR or MR, the real space is used as the background. In this case, the real space may be used as the background by the HMD 120 including a transmissive display device (optical see-through or video see-through display device). When the virtual space is applied to the MR, an object may be given an effect by the real space. In this manner, the virtual space includes a virtual scene, such as the background or a virtual object, in at least a part thereof so that the user may be provided with a virtual experience enabling interaction with the virtual scene. When the virtual space is applied to the AR or MR, the hand of the user may be used instead of a hand object. In this case, the left hand of the user is arranged in the virtual space 11 instead of a left hand object 1841L of FIG. 19, and the right hand of the user is arranged in the virtual space 11 instead of a right hand object 1841R of FIG. 19. Then, the server 150 may determine whether a communication action is performed based on the gesture of the hand of the user.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted the target object based on motion of the hand of the user.

What is claimed is:

1. A method, comprising:
   defining a virtual space, wherein the virtual space includes a 360-degree moving image;
   playing back the 360-degree moving image in the virtual space;
   detecting a motion of a head-mounted device (HMD);
   defining a visual field in the 360-degree moving image based on the detected motion;
   detecting an emotion of a first user associated with the HMD;

comparing the detected emotion with a first condition;
identifying a playback time of the 360-degree moving image at a timing of satisfaction of the first condition;
identifying a direction indicated by the first user in the virtual space at the timing of satisfaction of the first condition;
identifying a first region, wherein the first region comprises a part of the 360-degree moving image corresponding to the identified direction; and
changing an evaluation value of the first region in response to satisfaction of the first condition;
detecting an action of the first user in the virtual space after satisfaction of the first condition, wherein the changing the evaluation value comprises changing the evaluation value based on satisfaction of a second condition by the detected action;
defining a photography visual field in the virtual space in response to receiving a first input from the first user;
generating a photographed image corresponding to the photography visual field;
storing the photographed image in a memory;
posting the photographed image to a social networking service in response to receiving a second input from the first user; and
determining that the second condition is satisfied in response to the photographed image being posted.

2. The method according to claim 1,
wherein the virtual space comprises a second avatar associated with a second user, and
wherein the method further comprises:
 detecting whether the first user is in a conversation with the second user; and
 determining the second condition is satisfied in response to detection of the conversation in addition to the photographed image being posted.

3. The method according to claim 1,
wherein the virtual space comprises a second avatar associated with a second user, and
wherein the method further comprises:
 extracting at least one word contained in a conversation between the first user and the second user; and
 determining the second condition is satisfied in response to the at least one word identifying a position in the virtual space in addition to the photographed image being posted.

4. The method according to claim 1,
wherein the virtual space comprises a second avatar associated with a second user, and
wherein the method further comprises:
 extracting at least one word contained in a conversation between the first user and the second user;
 determining the second condition is satisfied in response to the at least one word identifying the playback time in addition to the photographed image being posted.

5. The method according to claim 1, further comprising:
determining the second condition is satisfied in response to the photographed image being stored in addition to the photographed image being posted.

6. The method according to claim 1, further comprising:
identifying a direction indicated by the first user in the virtual space based on the photography visual field; and
determining that the first condition is satisfied in response to the photographed image is stored.

7. The method according to claim 1, further comprising:
specifying the first region as a region of interest in response to the evaluation value exceeding a threshold value; and
generating a two-dimensional moving image containing the region of interest, wherein the two-dimensional moving image contains the playback time and a time length before and after the playback time.

8. The method according to claim 7,
wherein the virtual space comprises a virtual viewpoint associated with the first user, and
wherein the video is generated based on the virtual viewpoint in the virtual space and on the direction indicated by the first user in the virtual space.

9. A system, comprising:
a head-mounted device (HMD);
a non-transitory computer readable medium configured to store instructions thereon; and
a processor connected to the non-transitory computer readable medium, wherein the processor is configured to execute the instructions for:
 defining a virtual space, wherein the virtual space includes a 360-degree moving image;
 playing back the 360-degree moving image in the virtual space;
 detecting a motion of the HMD;
 defining a visual field in the 360-degree moving image based on the detected motion;
 detecting an emotion of a first user associated with the HMD;
 comparing the detected emotion with a first condition;
 identifying a playback time of the 360-degree moving image at a timing of satisfaction of the first condition;
 identifying a direction indicated by the first user in the virtual space at the timing of satisfaction of the first condition;
 identifying a first region, wherein the first region comprises a part of the 360-degree moving image corresponding to the identified direction;
 changing an evaluation value of the first region in response to satisfaction of the first condition;
 detecting an action of the first user in the virtual space after satisfaction of the first condition, wherein the changing the evaluation value comprises changing the evaluation value based on satisfaction of a second condition by the detected action;
 defining a photography visual field in the virtual space in response to receiving a first input from the first user;
 generating a photographed image corresponding to the photography visual field;
 storing the photographed image in the non-transitory computer readable medium;
 posting the photographed image to a social networking service in response to receiving a second input from the first user; and
 determining that the second condition is satisfied in response to the photographed image being posted.

10. The system according to claim 9, wherein the processor is further configured to execute the instructions for:
defining the virtual space comprising a second avatar associated with a second user;
detecting whether the first user is in a conversation with the second user; and
determining the second condition is satisfied in response to detection of the conversation in addition to the photographed image being posted.

11. The system according to claim 9, wherein the processor is further configured to execute the instructions for:
defining the virtual space comprising a second avatar associated with a second user;
extracting at least one word contained in a conversation between the first user and the second user; and
determining the second condition is satisfied in response to the at least one word identifying a position in the virtual space in addition to the photographed image being posted.

12. The system according to claim 9, wherein the processor is further configured to execute the instructions for:
defining the virtual space comprising a second avatar associated with a second user;
extracting at least one word contained in a conversation between the first user and the second user;
determining the second condition is satisfied in response to the at least one word identifying the playback time in addition to the photographed image being posted.

13. The system according to claim 9, wherein the processor is further configured to execute the instructions for:
determining the second condition is satisfied in response to the photographed image being stored in addition to the photographed image being posted.

14. The system according to claim 9, wherein the processor is further configured to execute the instructions for:
identifying a direction indicated by the first user in the virtual space based on the photography visual field;
determining that the first condition is satisfied in response to the photographed image is stored.

15. The system according to claim 9, wherein the processor is further configured to execute the instructions for:
specifying the first region as a region of interest in response to the evaluation value exceeding a threshold value; and
generating a two-dimensional moving image containing the region of interest, wherein the two-dimensional moving image contains the playback time and a time length before and after the playback time.

16. The method according to claim 15, wherein the processor is further configured to execute the instructions for:
defining the virtual space comprising a virtual viewpoint associated with the first user, and
generating the video based on the virtual viewpoint in the virtual space and on the direction indicated by the first user in the virtual space.

17. A method, comprising:
defining a virtual space, wherein the virtual space includes a 360-degree moving image, a first avatar object associated with a first user, and a second avatar object associated with a second user;
playing back the 360-degree moving image in the virtual space;
detecting a motion of a head-mounted device (HMD) associated with the first user;
defining a visual field in the 360-degree moving image based on the detected motion;
detecting an emotion of at least one of the first user or the second user;
comparing the detected emotion with a first condition;
identifying a playback time of the 360-degree moving image at a timing of satisfaction of the first condition;
identifying a direction indicated by at least one of the first user or the second user in the virtual space at the timing of satisfaction of the first condition;
identifying a first region, wherein the first region comprises a part of the 360-degree moving image corresponding to the identified direction;
changing an evaluation value of the first region in response to satisfaction of the first condition;
detecting an action of the first user in the virtual space after satisfaction of the first condition, wherein the changing the evaluation value comprises changing the evaluation value based on satisfaction of a second condition by the detected action;
defining a photography visual field in the virtual space in response to receiving a first input from the first user;
generating a photographed image corresponding to the photography visual field;
storing the photographed image in a memory;
posting the photographed image to a social networking service in response to receiving a second input from the first user; and
determining that the second condition is satisfied in response to the photographed image being posted.

* * * * *